Oct. 2, 1945.  O. W. OERMAN  2,385,935
TWO-WAY PLOW
Filed July 25, 1941   9 Sheets-Sheet 2

Fig. 2

INVENTOR
OREY W. OERMAN
BY
ATTORNEYS

Oct. 2, 1945.	O. W. OERMAN	2,385,935
TWO-WAY PLOW
Filed July 25, 1941	9 Sheets-Sheet 4

INVENTOR
OREY W. OERMAN
BY
ATTORNEYS

Oct. 2, 1945.     O. W. OERMAN     2,385,935
TWO-WAY PLOW
Filed July 25, 1941     9 Sheets-Sheet 5
Fig. 6
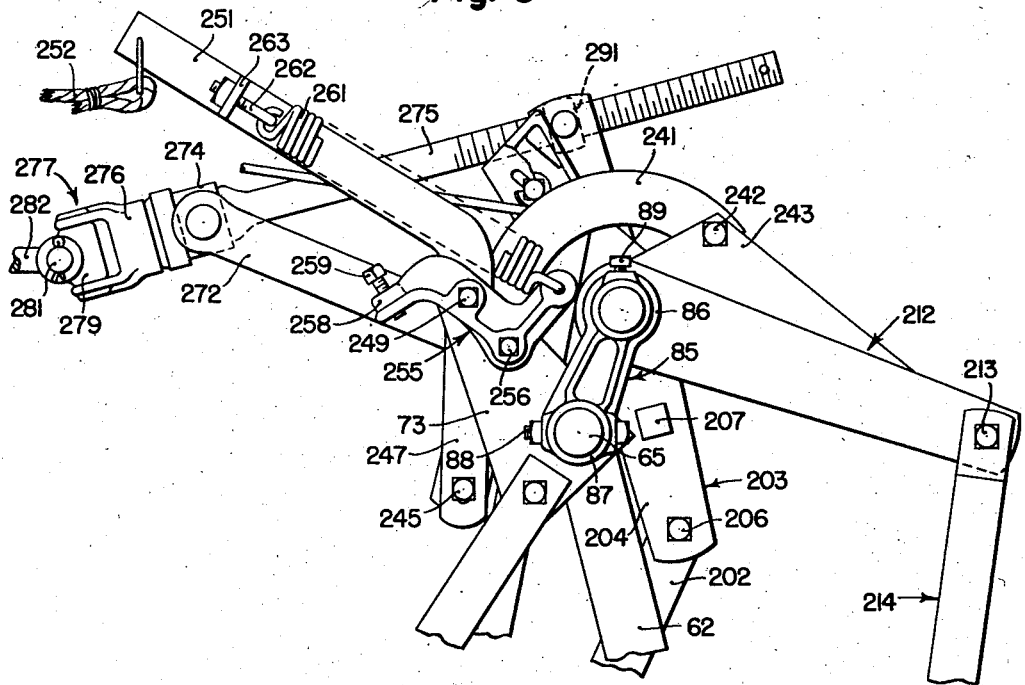
Fig. 7
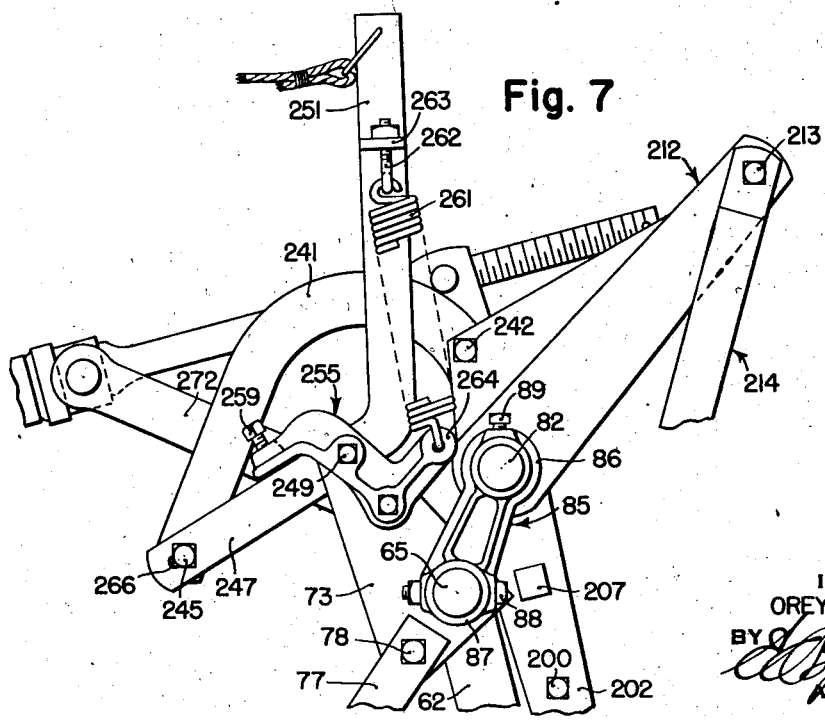
INVENTOR
OREY W. OERMAN
BY
ATTORNEYS

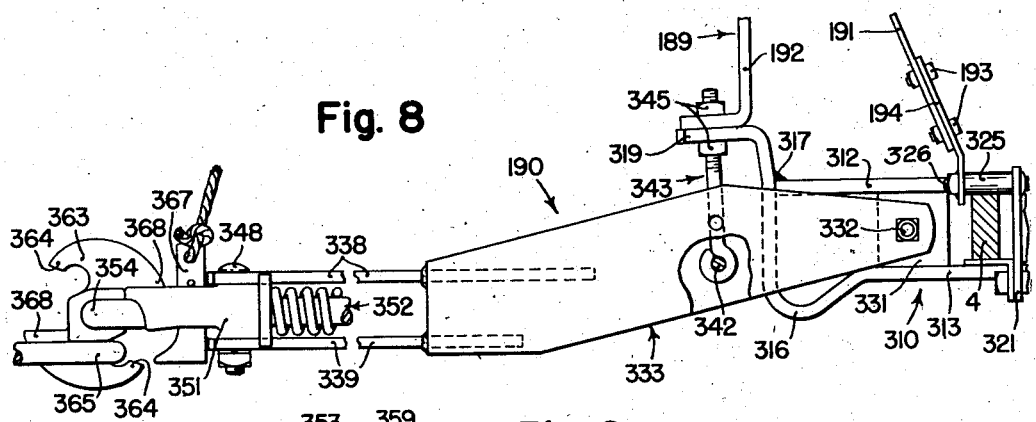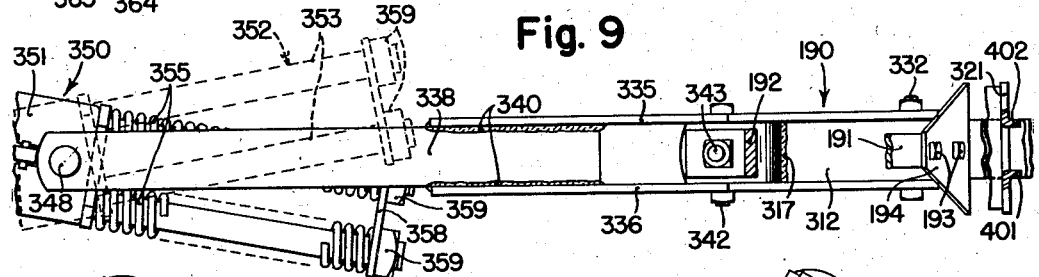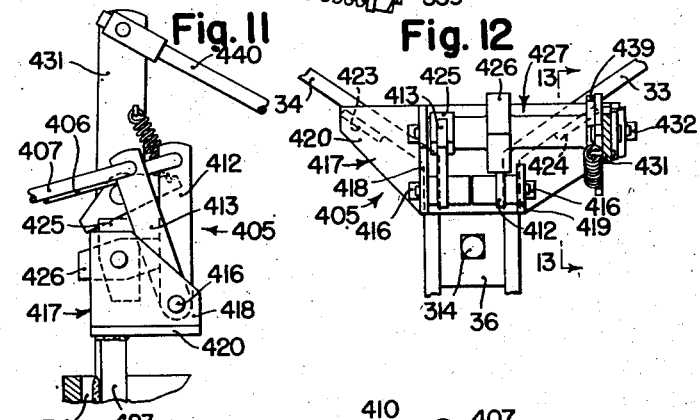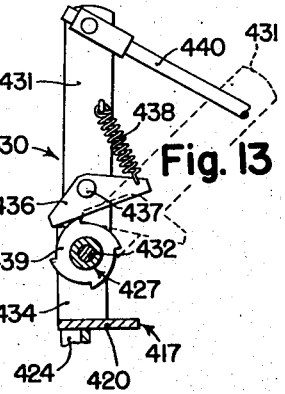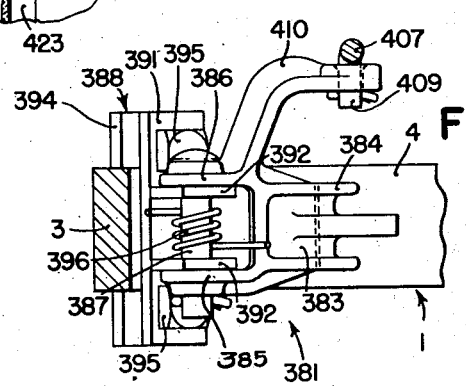

Oct. 2, 1945.    O. W. OERMAN    2,385,935
TWO-WAY PLOW
Filed July 25, 1941    9 Sheets-Sheet 7
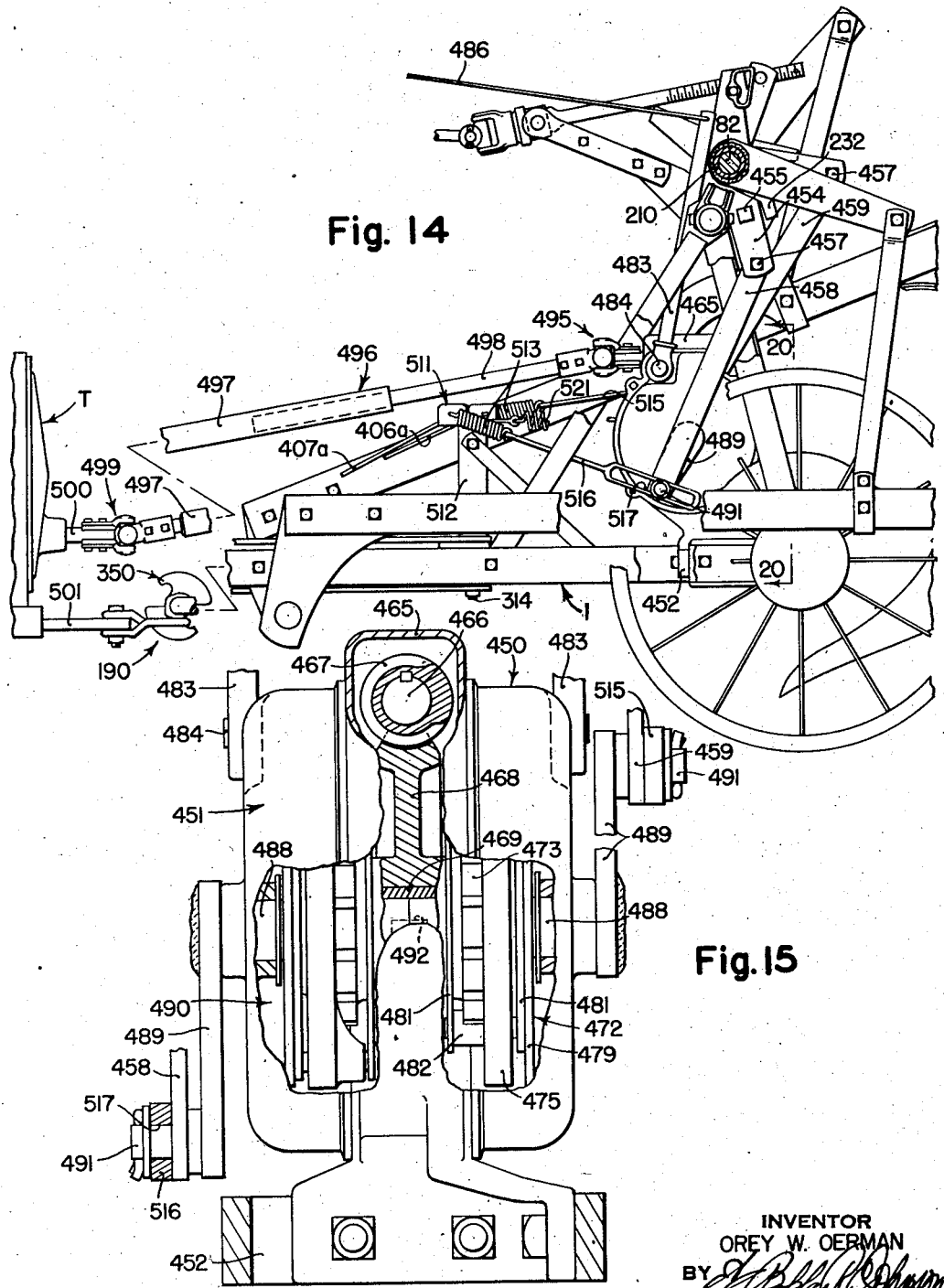

Patented Oct. 2, 1945

2,385,935

UNITED STATES PATENT OFFICE 2,385,935

TWO-WAY PLOW

Orey W. Oerman, Moline, Ill., assignor to Deere & Company, Moline, Ill., a corporation of Illinois Application July 25, 1941, Serial No. 404,018

39 Claims. (Cl. 97—29)

The present invention relates generally to agricultural implements and more particularly to two-way plows which are especially adapted for use where it is desired to throw all of the furrows in the same direction.

The object and general nature of the present invention is the provision of a two-way plow, preferably of the two-bottom type, in which the plow is carried on two wheels which always operate on the land, thereby serving as an excellent depth gauge for the plow and eliminting leveling levers and other parts that have to be provided in plows in which one wheel operates in the furrow. Another feature of the present invention is the provision of a two-way plow of this type which is relatively narrow and can be operated close to fences, ditches or the like, or backed into close quarters, permitting the operator to utilize every available bit of ground at the headlands. Specifically, it is a feature of this invention to provide a two-bottom, two-way plow in which the land wheels are disposed in between the beams of each pair of bottoms, thus producing not only a narrow two-way plow but also one which is particularly adapted as a towed implement in which the wheels are normally spaced a considerable distance from the previously opened furrow, whereby there is little likelihood of the wheel tending to run along the bottom of the furrow instead of on the land.

Another important feature of the present invention is the provision of a single lifting clutch mechanism deriving operating energy either from the tractor directly or from both of the land wheels whereby the operator has complete and easy control over both gangs. Another feature of this invention is the provision of a laterally swingable hitch which is controlled by the single lift clutch. Another feature of this invention is the provision of a constant lift, providing adequate clearance between the ground and the gang in non-operating position, regardless of the depth at which the working gang is plowing. More specifically, it is a feature of this invention to provide a laterally swingable hitch which is moved from one position to the other by the turning of the tractor or other propelling force and is controlled by latches which are automatically operated by the gang raising and lowering means. Further the hitch may be shifted when both gangs are in raised position by operating the lift clutch and turning the tractor to the right or left.

Further, an additional feature of this invention is the provision of depth adjusting means including a crank that swings with the drawbar or hitch so that the crank is always within easy reach from the operator's station on the tractor, yet is out of the way of the tractor wheels or treads when making short turns.

Another feature of this invention is the provision of a two-way plow having a pair of right and left hand lifting clutches operated directly from the tractor by a power take-off connection. Another feature is the provision of means associated with the right and left hand clutches for controlling the hitch latches.

Another feature of the present invention is the provision of means for loading at least a portion of the weight of the idle gang onto the gang in operating position under condition where additional penetration may be necessary, as when operating in very hard ground. It is also a feature of this invention to provide means whereby the operating depth of one gang may be adjusted relative to the other and the provision of means for utilizing a single crank screw for adjusting the operating depth of both plowing units.

These and other objects and advantages of the present invention will be apparent to those skilled in the art after a consideration of the following detailed description, taken in conjunction with the accompanying drawings in which the preferred forms of the invention have been illustrated.

In the drawings:

Figure 2 is a plan view of the plow shown in Figure 1, certain parts of the lifting and latching mechanism being omitted;

Figures 6 and 7 are fragmentary enlarged views of the lifting arm and holding latch, together with the associated depth adjusting means, associated with each right and left hand unit;

Figure 8 is a fragmentary side view of the vertically adjustable forward section of the laterally swingable hitch, the rear section of the latter being shown in Figure 2;

Figure 9 is a top or plan view of the hitch section shown in Figure 8, illustrating the laterally swingable cushion unit at the front end;

Figure 10 is an enlarged fragmentary view, taken substantially along the line 10—10 of Figure 2, showing one of the latches for holding the laterally swingable hitch in one position;

Figure 11 is a fragmentary view, taken along the line 11—11 of Figure 2, showing the rotary cam and associated parts for controlling the hitch latches;

Figure 12 is a plan view of the rotary cam of Figure 11;

Figure 13 is a view taken substantially along the line 13—13 of Figure 12, showing the mechanism for progressively advancing the rotary cam of Figures 11 and 12;

Figures 14 and 15 show a modified form of the present invention, similar to Figure 3, in which a double lifting clutch mechanism is driven by a power shaft connection with the power take-off shaft of the tractor, Figure 15 being a partial sectional view, looking forwardly, taken generally along the line 20—20 of Figure 14;

Figure 1:
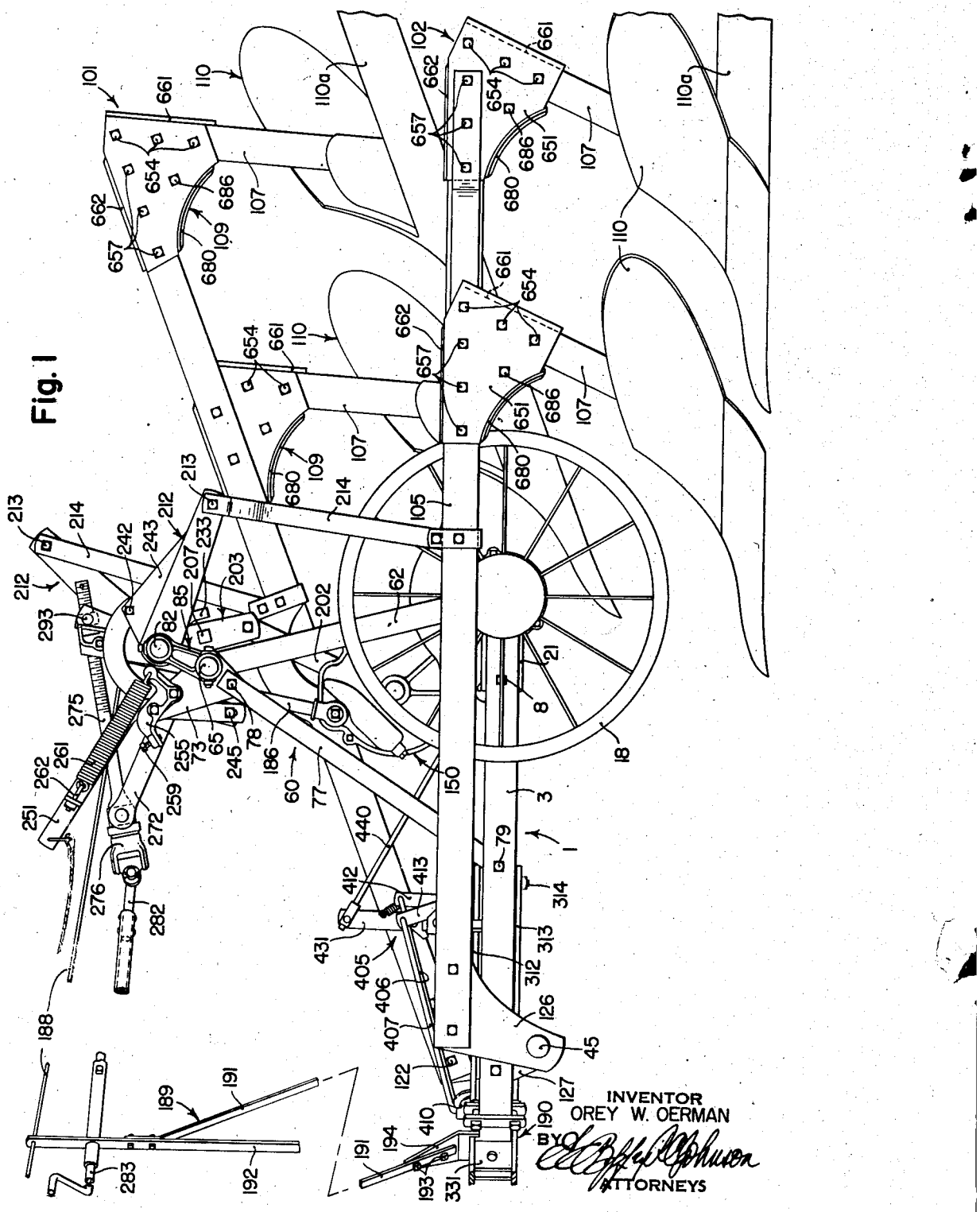
Figure 1 is a side view of a two-way plow constructed according to the principles of the present invention.
Figure 3:
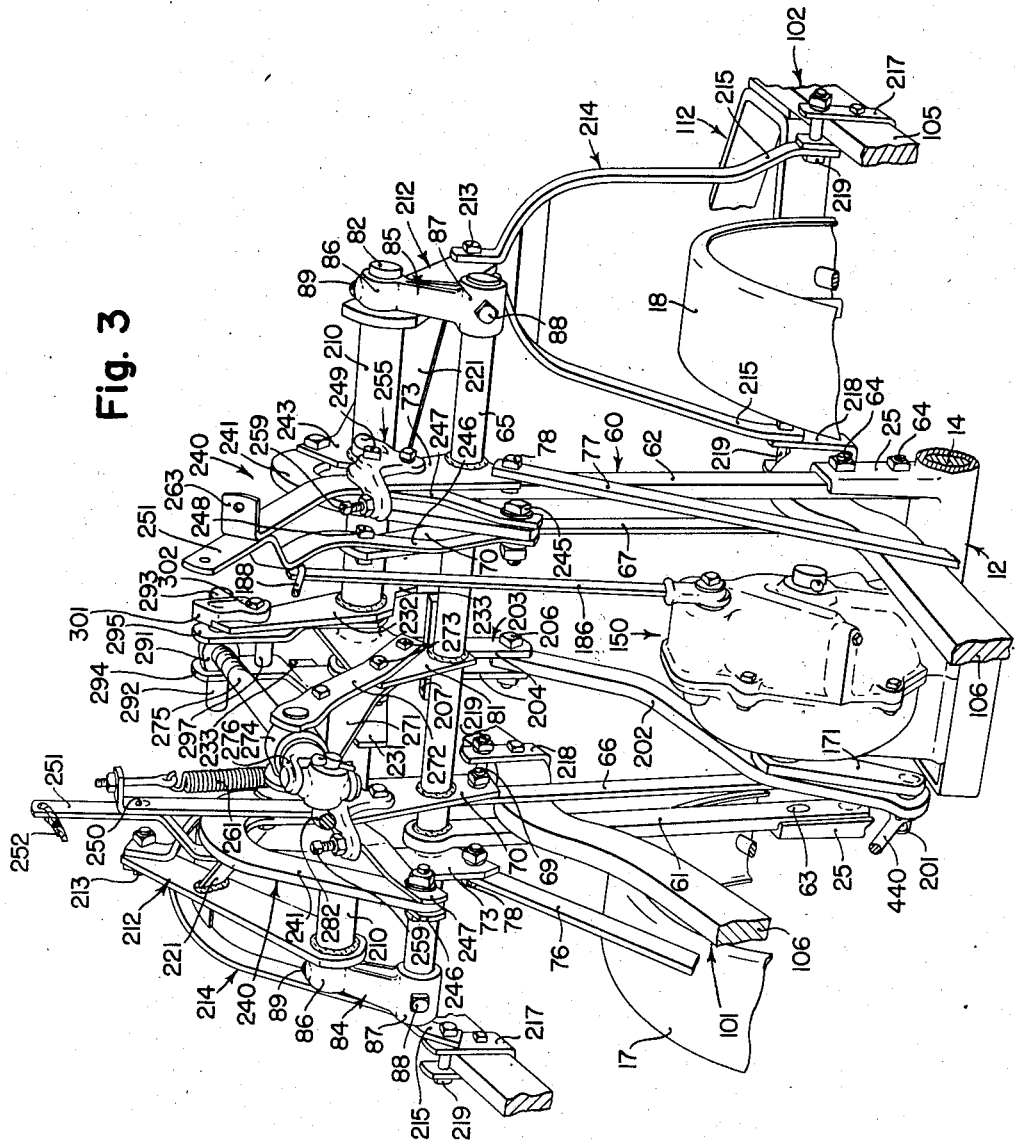
Figure 3 is a fragmentary perspective view showing certain details of the latching and depth adjusting mechanism and associated parts.

Referring now more particularly to Figures 1, 2 and 3 of the drawings, the frame of the implement is indicated in its entirety by the reference numeral 1, and as best shown in Figure 2, the frame 1 consists of generally longitudinally extending frame bars 2 and 3 connected together at their forward ends by a curved or arcuate section 4, which if desired may be integral with the bars 2 and 3. The rear ends of the bars 2 and 3 are bolted, as at 7 and 8, to right and left hand journal castings 11 and 12. Each of these members includes a sleeve section 13 in which a live axle 14 is mounted for rotation. Right and left hand land wheels 17 and 18 are secured in any suitable manner to the right and left ends, respectively, of the through axle 14. Each of the journal members 11 and 12 also includes a pair of forwardly extending frame bar receiving lugs 21 and 22, and a pair of generally vertically extending closely spaced lugs 25 and 26, the lugs 25 being similar to the lugs 21 and 22, all being apertured to receive clamping bolts. The bolts 7 and 8 are passed through the openings in the lugs 21 so as to secure the rear ends of the frame bars 2 and 3 firmly to the journal members 11 and 12. Similar bolts 31 pass through openings in the forward inner lugs 22 and serve to secure thereto the rear ends of a pair of right and left hand braces 33 and 34. These brace bars are generally of V formation having their intermediate portions secured, as by bolts 35, to a pivot block 36 and their forward and laterally outwardly divergent ends 37 apertured to receive pairs of bolts 38 by which the ends 37 are secured to the forward portions of the frame bars 2 and 3. The bolts 38 also secure a pair of downwardly extending brackets 43 to the frame bars 2 and 3, the brackets 43 being apertured to receive a transversely disposed beam pivot shaft 45. Inwardly of each of the brackets 43 is disposed a sleeve 46, through which the beam pivot shaft extends. Each sleeve 46 carries a set screw 47 by which the shaft 45 may be fixed in position relative to the frame and held against lateral displacement. The right and left hand plowing units, referred to below, are pivotally connected with the beam pivot shaft 45 for generally vertical swinging movement. As a part of the frame 1, the latter is provided with a lifting frame section, indicated in its entirety by the reference numeral 60. The lifting frame 60 includes a pair of generally vertically disposed bars 61 and 62 secured at their lower ends by bolts 63 and 64 to the vertically extending lugs 25 described above as formed on or carried by the right and left hand journal members 11 and 12. The upper ends of the vertical bars 61 and 62 are secured, as by welding, to a cross member in the form of a shaft 65 that extends generally transversely of the implement, as best shown in Figure 3. Another set of bars 66 and 67 are disposed, respectively, adjacent the upright bars 61 and 62 and at their lower ends are secured to the lugs 26 (Figure 2) formed on the journal members 11 and 12. The upper ends of the bars 66 and 67 are bolted, as at 69, to brackets 70 that are welded to the cross shaft 65 adjacent the upper ends of the upright bars 61 and 62. Companion brackets 73 are welded to the cross shaft 65 laterally outwardly of the brackets 70, and a pair of brace bars 76 and 77 are bolted, as at 78, at their upper ends to the brackets 73 and extend generally downwardly and forwardly and are bolted, as at 79, to the frame bars 2 and 3. The brace bars 76 and 77 provide for the desired fore and aft rigidity of the upright lifting frame 60. At the intermediate portion of the cross bar 65 a vertical bracket 81 is fixed, as by welding, and serves to support the intermediate portion of a second cross bar 82, the ends of which are supported by a pair of upwardly and rearwardly extending brackets 84 and 85, each having upper and lower sleeve sections 86 and 87 which receive, respectively, the ends of the upper cross shaft 82 and the lower cross shaft 65. The brackets 84 and 85 are securely fixed to the cross bar 65 by any suitable means, such as a pair of bolts 88 extending through the lower sleeves 87 and the ends of the bar 65. The cross bars 65 and 82 support the lifting and latching mechanism for the two plowing units, as will be described below. A pair of set screws 89 are threaded into tapped openings in the upper sleeves 86 and serve to fix the upper cross bar 82 in position.

Referring again to Figures 1 and 2, the two-way plow in which the principles of the present invention have been incorporated includes a pair of right and left hand units, indicated, respectively, by the reference numerals 101 and 102. Except for being constructed of right and left hand parts, respectively, the plowing units 101 and 102 are substantially identical, and hence a description of one unit will suffice. Each unit includes two plow beams 103 and 104, each beam including a generally fore and aft extending beam section 105 and 106, the beam sections 105 and 106 being identical except that one is slightly longer than the other, and a standard or beam shank 107. Each beam section and the associated shank are suitably connected together by a bracket construction, indicated in its entirety by the reference numeral 109, a detailed description of which appears below. A plow bottom 110 is fastened by any suitable means to the lower end of each of the beam standards 107. The rear ends of the beam sections 105 and 106 are braced by a bar member 112 constructed, as shown in Figure 2, with laterally spaced sections 113, 114 and 115 that are securely bolted to the rear ends of the beams. The front ends of the beams are also connected together by a brace member 117 of similar formation, including laterally spaced portions 118, 119 and 120 bolted, as at 121, 122 and 123 to the associated beams. The forward laterally spaced brace sections 119 and 120 are disposed opposite one another in a lateral direction, and a pair of downwardly extending brackets 126 and 127, apertured at their lower ends, are secured to the beams in any suitable manner, as by being bolted between the brace sections 119 and 120 and the front ends of the associated beams 103 and 104. The beam pivot shaft 45 passes through the openings in the lower ends of both sets of brackets 126, 127, whereby the right and left hand plowing units 101 and 102 are connected with the frame 1 for generally vertical swinging movement and in draft transmitting relation. A set screw collar 128 is mounted on the end of the pivot shaft 45 just inside the bracket 126 and serves to prevent laterally inward displacement of the plowing unit. The sleeve 46 disposed on the pivot shaft 45 laterally inwardly of the associated bracket 43 is in engagement with the laterally inner plow beam bracket 127 and cooperates with the latter in preventing laterally outward displacement of the plowing unit.

The left hand plowing unit 102 is, as mentioned above, of substantially identical construction with the right hand unit 101 described above, except that certain parts are left hand instead of right hand, and hence the same reference numerals have been used to indicate corresponding parts in the left hand unit 102. It is important to note that the supporting wheels 17 and 18 for the frame 1 are disposed so that the wheels lie between each pair of beams 105 and 106. As best shown in Figure 2, the laterally inner beam 106 of each gang is disposed between the associated vertical bars, the beam section 106 of the right hand unit being disposed between the bars 61 and 66 and the laterally inner beam for the left hand gang being disposed between the bars 62 and 67. As best shown in Figure 3, the pairs of bars 61, 66 and 62, 67 thus serve as vertical guides cooperating with the beams 106 of the right and left hand gangs, whereby both gangs are held rigidly to their lateral position so that they cannot interfere with each other but are constrained to generally vertical movement relative to the wheeled frame to which the gangs are pivoted by the pivot shaft 45.

According to the principles of the present invention, means is provided in the nature of a power lift for lifting either or both of the gangs into their raised or transport position, with separate latch means for holding either in a raised position while dropping the other into its operating position. Means is also provided for adjusting the depth of operation of either unit. The raising and lowering means, with associated parts, will now be described.

Figure 5:
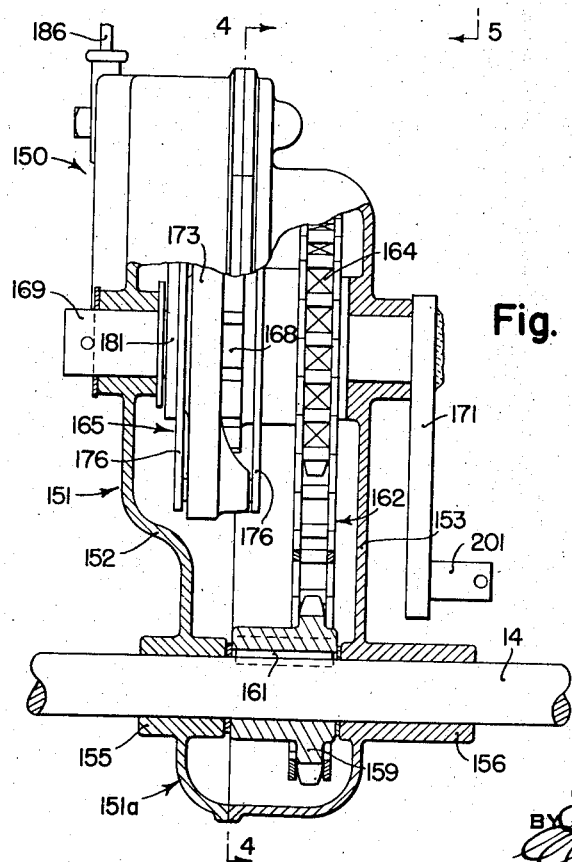
Figure 5 is a fragmentary sectional view taken generally along the line 5—5 of Figure 4.

In the preferred form of the present invention, I provide a self-interrupting clutch mechanism, indicated in its entirety by the reference numeral 150, deriving power from the rotation of the land wheels 17 and 18. The self-interrupting clutch mechanism 150 includes a casing 151 made up of two parts 152 and 153 provided with inter- engaging flanges which are bolted together, as at 154. The casing 151 is extended, as at 151a, and embraces the axle shaft 14. The portion 151a of the clutch casing 151 is provided with bearing sleeve sections 155 and 156, as best shown in Figure 5. A sprocket 159 is securely fixed to the shaft 14, as by a key 161, and receives the lower end of a sprocket chain 162, the upper end of which is trained around a driven sprocket 164 that serves as the driving member for the clutch mechanism proper, indicated in its entirety by the reference numeral 165. The present invention is not especially concerned with the particular details per se of the self-interrupting clutch mechanism 165. Preferably, the clutch 165 is constructed along the lines of the power lift clutch disclosed and claimed in the co-pending application of Carl G. Strandlund, Serial No. 340,925, filed June 17, 1940, to which reference may be had if necessary. Briefly, the clutch mechanism 165 comprises a scalloped driving member 168 that is rotatable at all times with the wheel axle 14 through the driven sprocket 164 and associated parts. The driven part of the clutch 165 is represented by the shaft 169 and the crank 171 secured to the right end of the shaft 169. The shaft carries a driven clutch part 173 which is in the form of a disk having a notch 174 therein and a strap member 176 pivoted to the disk at 177 and at the other end carrying a roller (not shown) that in one position is adapted to engage in the scallops 168 and in another position out of engagement with the scallops 168. The strap member 176 and its roller is controlled by a rockable member 181 mounted for rotation about the axis of the driven shaft 169 and controlled by a trip arm 183 carried within the casing 151 on a rock shaft 184, the end of which extends laterally outwardly of the casing 151 and receives a control arm or trip lever 186. Spring means (not shown) normally biases the strap member 176 and its roller for movement into engagement with the scallops 168, thereby connecting the shaft 169 and the crank 171 with the axle shaft 14 to be driven by both land wheels 17 and 18 through the sprocket chain and the clutch mechanism 165. For controlling the clutch 150 I provide a rod 188 which is connected at its rear end to the upper end of the trip lever 186 and forwardly thereof is supported by a bracket 189 which is carried on a laterally shiftable hitch member, indicated in its entirety by the reference numeral 190 and which will be described in detail below. The bracket 189 comprises two interconnected members 191 and 192, the latter comprising the standard proper while the member 191 is a brace bolted, as at 193, to a bracket 194 welded to one of the bars making up the hitch member 190. The upper end of the standard 192 is apertured to receive the trip rod 188.

The crank 171 of the power lift clutch 150 carries a crank pin 201 which receives the lower end of a lifting link 202. The link 202 extends upwardly from the pin 201 to an arm 203 mounted for rocking movement on the upper cross shaft 82 (Figure 3) of the lifting frame 60. The arm 203 is made up of a pair of plates 204 which are apertured to receive a pivot bolt 206 by which the link 202 is connected to the arm 203. A transverse pin or bar 207 is fixed to the plate members 204 making up the arm 203. As best shown in Figure 3, the bar 207 is disposed so as to extend on opposite sides of the arm 203. The arm 203 is mounted for rocking movement on the cross shaft 82 adjacent the center bracket 81 supporting the intermediate portion of the shaft 82.

The upward movement of the arm 203 is made use of for raising either or both of the right and left hand gangs 101 and 102. To this end, a sleeve 210 is mounted for rocking movement on the shaft 82 at each side of the center bracket 81, each sleeve 210 being elongated and extending substantially from the center bracket 81 laterally outwardly to the supporting bracket 84 or 85. For the left hand unit, the left hand sleeve 210 is provided with a generally rearwardly extending arm 212, the rear end of which is apertured to receive a bolt 213 by which a yoke 214 is pivoted thereto. The yoke 214 comprises a generally U-shaped member, the lower ends 215 of which are pivotally connected to the beams 105 and 106 by brackets 217 and 218, each of which carries a bolt 219 to which the lower end 215 of the yoke 214 is pivoted. A brace 221 extends from the outer portion of the arm 212 laterally inwardly to generally the central portion of the left hand sleeve 210 and is welded to the latter or otherwise permanently secured thereto, as desired. The brace 221 forms a part of the arm 212. A similar arm and bail construction is provided for the right hand unit 101 and therefore the same reference numerals have been used to indicate corresponding parts.

In order to lift either or both of the plow units, and to determine the operating depth thereof, a pair of arms 231 and 232 are fixed, respectively, to the laterally inner ends of the right and left hand sleeves 210, preferably by welding. Each of the arms 231 and 232 is extended downwardly to form a section 233 that is disposed in the path of movement of the clutch actuated lifting bar 207. Therefore, whenever the clutch is actuated to swing the lifting arm 203 (Figure 1) in a counterclockwise direction, rearwardly and upwardly, the bar 207 engages either or both of the ends 233 of the arms 231 and 232, rocking either or both of the lifting sleeves 210 and raising either or both of the lifting arms 212, thus raising either or both of the gangs 101 and 102.

For holding either or both of the gangs in their raised position, I provide a pair of over-center latches, one for each unit. The over-center latches are substantially identical and hence a description of one will suffice.

The over-center latch for the left-hand unit is indicated in its entirety by the reference numeral 240 and includes a curved link 241 pivoted by a bolt 242 to an upward extension 243 of the brace member 221. The forward end of the curved link 241 is apertured to receive a bolt 245 by which a pair of links 246 and 247 are pivoted thereto. The two link members 246 and 247 are mounted for pivotal movement by bolts 248 and 249 carried at the upper ends of the two brackets 70 and 73. The two link members 246 and 247 are connected together, as by a rivet 250 and the bolt 245, serving in effect as one link. The link member 246 is extended upwardly, as at 251, to serve as an arm to which a control member such as a cable 252, is connected. A casting 255 is connected to the bracket 73 by any suitable means, such as the bolt 249 and a second bolt 256, and the member 255 is formed with an extension 258 which is tapped to receive a set screw 259. The latter is disposed in a position to be engaged by the upper edge of the link member 247 when the left-hand gang is raised into its inoperative or transport position. Figure 6 illustrates the position of the arm 212 and the bail 214 when the associated gang is lowered, and when the gang is raised, as by the upward and rearward movement of the arm 203 causing the bar 207 to engage the end 233 (Figure 3) of the lifting arm 232, the upward swinging movement of the lifting arm 212 exerts a forward thrust through the link 241 (Figure 6) against the companion toggle link 247, rocking the latter in a clockwise direction (Figures 6 and 7) substantially until the pivots defined by the bolts 242, 249 and 245 are in a straight line. A spring 261 is connected by an adjustable eyebolt 262 to the laterally turned end 263 of the link member 247. The lower end of the spring 261 is anchored in an extension 264 of the casting member 255. Thus, whenever the gang is raised and the pivots 242, 249 and 245 approach a straight line position, as is shown in Figure 7, the spring 261 anchored to the fixed casting 255 serves to bias the arm 251 and the toggle link 246, 247 for clockwise movement (Figure 7), thus raising the pivot 245 to a point slightly above the line passing through the pivot points 242 and 249. This clockwise movement of the toggle links 246, 247 is limited by the engagement of the link member 247 with the set screw 259. When the links 241 and 246, 247 pass into their over-center position, as determined by the adjustment of the set screw 259, the associated arm 231 is held in its raised position, thus holding the associated gang in its raised position. The toggle may be released, however, merely by a pull on the cable 252, which lowers the pivot 245 below the line joining the pivots 242 and 249, whereupon the weight of the gang swings the arm 221 downwardly and the arm 251 forwardly, into the position shown in Figure 6.

The toggle or over-center latching means just described above for the left-hand gang is of substantially the same construction as the toggle latch mechanism for the right-hand gang, and hence the parts of the latter mechanism have been indicated by corresponding reference numerals. In order to permit the spring 261 to swing the toggle links 241, 246 and 247 into their over-center position, the forward ends of the links 246 and 247 are provided with slots 266 (Figure 7).

The lowered position of the two gangs is determined by stop means associated with the laterally inner arms 231 and 232 that are fixed to the laterally inner ends of the right and left hand lifting sleeves 210. For adjusting the lowered position of the gangs, I provide a bracket comprising two spaced straps 271 and 272 bolted, as at 273, to the center bracket 81 and spaced apart at their upper and forward ends to receive a trunnion member 274 through which a depth adjusting screw 275 passes. At its forward end the screw 275 is connected to one yoke 276 of a universal joint 277. The universal joint 277 also includes a pivot block 279 which receives the laterally turned end 281 of a depth adjusting rod 282. The latter extends forwardly and is supported by an opening below the upper end of the standard 192, the forward end of the rod 282 having a crank 283 thereon whereby the depth adjusting screw 275 may be rotated. The rear end of the screw 275 is threaded into a trunnion member 291, the trunnions 292 and 293 of which are extended laterally and are disposed in apertures in the upper ends of a pair of arms 294 and 295. The lower ends of these arms are apertured and offset laterally outwardly so as to permit them to clear the lifting arm straps 204 and to be rockably mounted on the central portion of the cross shaft 82. The members 294 and 295 are secured together, as by a bolt 297, so as to act as a rigid arm member. Since the front end of the rod 283, as well as the rod 188, are carried by the swingable hitch 190, these parts are always conveniently accessible to the operator.

The extended trunnions 292 and 293 are disposed in the path of movement of the upper ends of the lifting arms 231 and 232, the trunnion ends being disposed rearwardly of said arms so that, when either or both of the over-center latches 240 are released, the engagement of the upper ends of the arms 231 and 232 with the trunnion ends 292 and 293 serves as a stop limiting the downward movement of the gang carrying arms 212. Thus, the position of the depth adjusting arms 294, 295 determines the operating depth to which the plow bottoms are permitted to penetrate. To provide for adjusting the position of one arm relative to the other, I mount a wedge block 301 for sliding movement, as by a bolt 302, on the upper end of the arm 232, and by adjusting the position of the wedge block 301 along the arm, the point of its contact with the associated stop member 293 relative to the point of contact of the other arm 231 with the other stop member 292 may be adjusted. By turning the crank 283, the trunnion member 291 may be moved farther forward or farther rearward, as desired, thus decreasing or increasing, respectively, the operating depth of the tools. It will be observed that this depth adjusting member is effective against which ever one of the operating units is in operating position; if the other is locked in its transport position, as shown in Figure 3, its depth adjusting arm, 231 in Figure 3, merely occupies a forward position away from the associated trunnion or stop member 292. Thus, with a single depth adjusting member, I am enabled to control the operating depth of either of the right or left hand plowing units.

The laterally swingable hitch 190 comprises a rear section 310 which is made up of an upper bar 312 and a lower bar 313 apertured at their rear ends to receive a bolt 314 (Figures 1 and 2) by which the hitch 190 is pivotally connected with the block 36 for lateral swinging movement. The upper and lower bars 312 and 313 extend forwardly beyond the arcuate frame section 4, the latter being disposed between the upper and lower bars, as best shown in Figure 8. The front portion of the lower bar 313 is bent downwardly, as at 316 (Figure 8), and is then extended upwardly where it is welded at 317 to the front end of the upper bar 312. The forwardmost portion of the lower bar 313 is bent forwardly, as at 319, to form a bracket which supports the lower end of the standard 192, the latter carrying the depth adjusting crank and the rod controlling the clutch trip lever. Rearwardly of the bracket 194 that supports the brace 191, a plate 321 is fixed to the upper and lower bars 312 and 313, and a pair of rollers 325 are mounted for rotation on bolts 326 connecting the bracket 194 and the plate 321. The rollers 325 move along the curved frame bar section 4, as will be clear from Figure 2.

Forward of the bracket 194, the upper and lower hitch bars 312 and 313 are connected together by plates 331, preferably welded to the bars 312 and 313, and the plates 331 are apertured to receive a bolt 332 by which a vertically shiftable hitch section 333 is connected with the front end of the laterally shiftable hitch section 310. The forward or vertically swingable hitch section 333 comprises a pair of plates 335 and 336 disposed at opposite sides of the front end portion 316 of the lower hitch bar 313, the forward end of the latter thus serving as a guide for the front hitch section 333 between the rear ends of the two plates 335 and 336. The plates 335 and 336 are connected together in laterally spaced apart relation by a pair of upper and lower straps 338 and 339 which, as best shown in Figure 9, are welded, as at 340, to the front ends of the plates 335 and 336. A bolt 342 extends through openings in the plates 335 and 336 under the bracket 319 and receives the eye of a vertically disposed adjusting bolt 343. The upper threaded end of the latter extends through openings in the bracket 319 and in the lower end of the standard 192, and a pair of lock nuts 345 on the bolt 343 serves to fix the latter, and the vertically swingable hitch section 333, in adjusted position. Loosening one of the nuts 345 and tightening the other, raises or lowers the front end of the hitch section 333 to correspond to the depth adjustment.

The forward ends of the straps 338 and 339 are apertured to receive a pivot bolt 348 by which a spring cushion release hitch unit 350 is connected thereto. The present invention is not particularly concerned with the details of the hitch unit 350, the same being substantially like that shown in the United States Patent No. 2,271,748, issued February 3, 1942, to Carl G. Strandlund, to which reference may be had if necessary. Briefly, the spring cushion release unit 350 includes a frame made up of the upper and lower straps 338 and 339 and an abutment member 351 which is apertured longitudinally to receive a slidable U-shaped draft bolt 352. The latter includes end portions 353 and a bight portion 354. Cushion springs 355 are disposed about the portions 353 of the draft bolt 352 and are compressed between the rear end of the abutment member 351 and an abutment plate 358 which is held in position on the draft bolt 352 by a pair of adjusting nuts 359. A rotatable coupling member 363 is mounted on the bight portion 354 of the draft bolt 352. The coupling member 363 is preferably in the form of a generally circular casting having a plurality of open ended draft jaws or hook portions 364, each of which is adapted to receive a clevis member 365, the latter receiving power from the tractor which propels the plow. A vertically slidable link 367 is carried by the abutment member 351 for normally holding the clevis 365 in position engaged in one or the other of the draft hook portions 364. The rotatable draft coupling member 363 is also provided with an abutment shoulder 368, one for each draft hook 364, and the function of the shoulder 368 is to prevent the coupling member 363 from rotating unless the draft pull increases to an abnormal degree, compressing the springs 355 to a point where the shoulder 368 becomes disengaged from the abutment member 351, thus permitting the coupling member to rotate and free the clevis member 365 from connection therewith. The springs 355 cushion the application of draft power by yielding, the shoulder 368 sliding in and out relative to the abutment member 351 but not becoming disengaged therefrom until the load reaches an abnormal degree. The point of release may be adjusted by tightening or loosening the adjusting nuts 359.

Figure 2 shows one operating position of the hitch 190, in which the hitch is disposed at an angle to the general longitudinal axis of the machine, this being for the purpose of disposing the forward end of the hitch substantially in longitudinal alignment with the plowing unit that is in operating or plowing position. When the other plowing unit is to be in operating position, the hitch 190 is swung to the other side. Therefore, in view of the fact that the hitch member 190 occupies a position at an angle to the line of pull, first to one side of the line of pull and then to the other side, the spring cushion unit 350 is arranged for pivoting action on the pivot bolt 348, the two positions of the unit relative to the hitch 190 being shown in Figure 9. This construction has the advantage that the sliding parts are always disposed in the line of pull, regardless of the angular disposition of the hitch 190. If the line of pull were disposed at an angle to the slidable parts of the cushion unit 350, binding of the parts that move relative to one another might interfere with the proper response of the unit 350 to abnormal load conditions, but where the unit 350 is pivotally mounted so that it can always swing into the line of pull, the advantages and functions of the unit 350 are retained, irrespective of the angular position of the hitch 190.

The position of the laterally swingable hitch 190, pivoted at 314 to the wheel supported frame of the implement, is automatically controlled by means operated by the power lift clutch 150. As described above, the latter operates through a complete revolution each time the trip lever 186 is actuated. The first range of movement of the clutch serves to elevate the lifting arm 203, thus raising either or both of the plowing units which then are locked in their raised position by the latches 240, and then the second half or second range of movement of the clutch brings the arm 171 back to the lower position shown in Figure 3, in which the lifting arm 203 is in its lower position so as to be out of the way of the raising arm, 231 or 232, of the unit that it is desired to lower. The movement of the clutch mechanism through the second range is, according to the present invention, made use of in controlling the hitch 190, and such means will now be described. A pair of right and left hand latches, indicated by the reference numerals 380 and 381, are mounted on the forward bar 4 of the wheel supported frame 1, and with the exception that certain parts are right hand while others are left hand, the latches 380 and 381 are identical, and hence a description of one will suffice. The left hand latch 381 is shown in Figure 10 and comprises a detent member 383, preferably in the form of a casting having a hook portion 384 (Figure 2) and a pair of attaching arms 385 and 386 (Figure 10) apertured so as to be mounted on a pintle 387 supported in a bracket 388. The latter comprises a plate 391 having a pair of lugs 392 supporting the pintle, and a clamping plate 394 cooperating with a pair of bolts 395 which secure the latch to the bar 4 of the frame, adjacent the juncture with the longitudinal frame bar section 3, as best shown in Figure 2. A spring 396 is disposed about the pintle 387 and has one end engaging the plate 391 while the other end engages the detent 383. The spring 396 thus urges the detent 383 in a counterclockwise direction (Figure 2), toward engagement with the hitch 190. The latter is formed with a pair of lugs 401 and 402 (Figure 9) on the plate 321, the lug 401 being adapted to be engaged with the hook 384 while the other lug 402 is adapted to be engaged by the corresponding hook on the other latch 380. Thus, the latches 380 and 381 are adapted, respectively, to lock the hitch 190 in the right-hand position (full lines, Figure 2) or in the left hand position, so as to hold the hitch in a position disposing the spring cushion release unit 350 either in the right hand position or in the left hand position.

The latches 380 and 381 are automatically controlled by the movement of the clutch 150 through its second range of movement for alternately moving one latch out of its position engaging the hitch 190 and moving the other latch into a position in which it may engage the hitch when the latter is moved to that side of the plow frame. In other words, assuming that the left hand unit 102 (Figure 2) is in a raised position and the right hand unit 101 in a lowered or operating position, the hitch 190 will be swung to the right, as shown in Figure 2, so as to dispose the hitch connection in line with the center of resistance of the two right-hand plow bottoms 110. At the end of the field, it is desired to raise the right-hand unit 101 into inoperative position and to lower the left-hand unit, at the same time providing for moving the hitch 190 from the right-hand position over to its left-hand position. This is automatically performed by first disengaging the latch 380 to permit the turning of the tractor to swing the hitch 190 over to the left-hand position and by permitting the left-hand latch 381 to engage the hitch 190 and lock the latter in its left-hand position, the straightening of the tractor relative to the plow after making the turn at the field serving to shift the hitch 190 from its right-hand position to its left-hand position. If the left unit is down, these positions are reversed.

The two latches 380 and 381 are controlled by cam mechanism actuated from the power lift clutch 150, the cam mechanism being indicated in its entirety by the reference numeral 405. The cam mechanism includes a pair of operating links 406 and 407 (Figure 2) which are connected at their forward ends, respectively, to the latches 380 and 381. Preferably, as best shown in Figure 10, the left-hand link 407 is provided with a down-turned end 409 disposed in an opening in an arm 410 formed on the detent 383. The right-hand link 406 is connected with the detent of the latch 380 in a similar manner. The rear ends of the latch controlling links 406 and 407 are connected, respectively, to a pair of pivotally mounted arms 412 and 413, the arms preferably being swingably mounted on a pin 416 carried by a bracket 417 provided with a pair of lugs 418 and 419 in which the pin 416 is supported. The bracket 417 includes a bottom plate 420 which is bolted to the outwardly diverging forward portions of the frame bars 33 and 34 by a pair of lugs 423 and 424. The two arms 412 and 413 are adapted to be actuated by a pair of cam elements 425 and 426, preferably formed integral on a cam member, indicated in its entirety by the reference numeral 427. The cam elements 425 and 426 are so disposed with respect to one another that, as best shown in Figure 11, when one cam element moves the associated arm, 412 or 413, rearwardly to pull the associated latch away from the hitch 190, the other arm is in a forward position permitting the latch associated with the latter arm to engage the hitch 190 when the latter is moved into engagement therewith.

The cam member 427 is progressively rotated in one direction by ratchet mechanism, best shown in Figure 13, and which is indicated in its entirety by the reference numeral 430. The ratchet mechanism comprises an arm 431 mounted for oscillatory movement about a shaft 432 upon which the cam member 427 is carried. The shaft 432 is supported by the bracket section 418 and an upstanding arm 434 at the right side of the bracket 417. The arm 431 carries a pawl 436 pivoted thereto, as at 437, and which is provided with a spring 438 anchored at one end to the arm 431 and at the other end to the pawl 436, whereby the latter is biased for movement into engagement with a ratchet wheel 439 which preferably is formed as an integral part of or carried by the cam member 427. The arm 431 is connected by a link 440 to the crank pin 201 (Figure 3) carried by the crank arm 171 of the clutch 150. The parts are so arranged that whenever the crank 171 makes a complete revolution, the cam member 427 is rotated through a quarter of a revolution. As best shown in Figure 11, rotation of the cam sections 425 and 426 through a quarter of a revolution will move one of the arms 412 or 413 rearwardly while permitting the other arm to move forwardly. In this way, one of the latches is pulled out of engagement with the hitch 190 while the other is moved forwardly, by the associated spring, into a position to engage the hitch 190, when the latter is swung into that position by the turning of the tractor relative to the implement.

The operation of the implement as so far described is substantially as follows:

Figures 1 and 3 show the right hand plowing unit 101 in raised or inoperative position while the left hand plowing unit 102 is in operating position. In Figure 2, both plowing units 101 and 102 have been shown in lowered position for convenience of illustration, with the hitch 190 in its right hand position, but it will be understood that when the implement parts are arranged as shown in Figure 3, the hitch 190 will be swung over to the other position, namely, to the left, and the position of the latches 380 and 381 will be reversed, the latch 380 being pulled out of engagement with the hitch 190 and the latch 381 in the forward position in engagement with the latch 190. When the right hand unit 101 is in its elevated position, it is held in that position by the toggle lock 240, the parts of which occupy the positions shown in Figure 3, with the weight of the unit 101 sustained by the arm 212 in its upper position, the link 241 holding the arm in this position by virtue of the over-center relation of the arm 246, 247 and the engagement of the section 247 thereof with the adjustable set screw 259. The operating position of the left hand unit 102 is determined by the engagement of the arm 232 (Figure 3) with the stop 293 on the adjustable depth adjusting stop arm 294, 295, this contact taking place through the adjustable wedge 301 which is slidable along the outer end of the arm 232. The arm 294, 295 as a whole is adjusted in one direction or the other by turning the screw 275.

When the operator reaches the end of the field, he pulls on the trip lever rod 188, which swings the trip lever 186 forwardly. This raises the arm 183 (Figure 4) within the casing 151 and permits the plate 181 to rock so as to engage the driving and driven members of the clutch 150. The rotation of the ground wheels 17 and 18 causes the shaft 14 to rotate, and this rotation is transmitted through the chain 162 and the engaged clutch parts to the crank 171, which is rotated rearwardly and upwardly through its first range of movement. The rearward and upward swinging of the crank 171 exerts a lifting force through the link 202 (Figure 3) and raises the lift arm 203 into an upward position, carrying with it the lift bar 207 which engages the end 233 of the arm 232. Thus, the upward swinging of the lift arm 203 causes the arm 232 and the rockable sleeve 210 to rock in a counterclockwise direction (Figures 6 and 7) which lifts the arm 212 for the left hand unit 102 from the position shown in Figure 6, i. e., the operating position, into its raised position (Figure 7), thereby lifting the left hand unit 102 into its transport position. As the arm 212 swings upwardly, the pivot bolt 242 is shifted generally in a forward direction, and this causes the arm 246, 247 to swing forwardly and upwardly, in a clockwise direction as viewed in Figures 6 and 7, until the points 242, 249 and 245 are substantially in a straight line. When the parts approach this position, the spring 261 becomes effective to swing the arm 246, 247 farther in a clockwise direction until the section 247 engages the set screw 259. When this occurs the arm 241 and the arm 246, 247 occupy their over-center position in which the arm 212 is then prevented from swinging downwardly, or clockwise as viewed in Figures 6 and 7. Thus, through the first half of the rotation of the crank 171, the left hand unit 102 has been raised into its transport position and locked in that position by the over-center latch mechanism.

The clutch 150 then continues to rotate through its second range of movement, namely, from a position in which the crank 171 is disposed generally upwardly to a position in which the crank 171 returns to the position shown in Figure 3. This latter half of the rotation of the crank 171 is utilized for exerting a forward thrust through the cam actuating link 440 to advance the cam member 427 of the cam mechanism 430 through a quarter of a revolution. During the first half or lifting range of the clutch 150, the arm 431 (Figure 13) moved rearwardly into the position shown in dotted lines, but due to the ratcheting of the pawl 436 over the ratchet wheel 439, the position of the cam elements 425 and 426 was not changed. However, during the second half of the movement of the crank arm 171 from its upper position back to its lower position (Figure 3), the arm 431 is moved forwardly from its dotted line position beyond its full line position (Figure 13) which advances the cam member 427 through a quarter of a revolution. This movement of the arm 431 in advancing the cam member 427 causes one end of the cam element 425 to move the arm 413 out of the position shown in Figure 11 and into the position shown in Figure 2, pulling rearwardly on the link 407 so as to disengage the latch 381, which is engaged when the arm 413 is in the position shown in Figure 11. At the same time, the other cam element 426 is moved from a generally horizontal position to a generally vertical position, as shown in Figure 2, permitting the arm 412 to move forwardly under the bias of the spring 396 (Figure 10) of the associated latch 380 which then moves into the position shown in Figure 2. Thus, the latch 380, which is held out of its engaging position when the arm 412 is in the position shown in Figure 11, is permitted to move into the position shown in Figure 2, ready to engage the hitch 190.

After the clutch member 150 has moved through its complete cycle, as described above, the left hand plowing unit 102, formerly in operating position, is raised into and locked in its raised position. Both plowing units are then normally in raised position and the outfit can readily be turned around. This turning movement is normally to the right, and, since the latch 381 is now disengaged from the hitch 190, the latter is permitted to swing over into its right hand position and to be latched in that position by the latch 380, as shown in Figure 2. Then after the operator has completed the turn and is ready to begin operations, all it is necessary to do is to lower the right hand unit 101, which is done by pulling on the cable connected to the upper end of the arm 251 for the right hand unit. This will lower the point 245 below its over-center position so that the weight of the right hand unit will then cause the same to drop into operating position, the latch controlling arm 251 moving into a position corresponding to the position of the left hand arm 251 shown in Figure 6. The relation between the hitch controlling latches 380 and 381 and the two plowing units 101 and 102 may be reversed at any time desired merely by operating the clutch 150 through one revolution with both plowing units latched in raised position. During the raising and lowering operation, each of the plowing units is guided by virtue of the laterally inner plow beams 106 being guided between the upright bars 62 and 67, and since each gang frame is hinged in laterally spaced relation to the bar 45, both the working gang and the non-working gang are held rigidly in their lateral positions so that they cannot interfere with each other. It will be noted that the lift is constant, providing adequate clearance between the ground and the idle gang, and is independent of the position of the depth adjusting member 294, 295.

The latch brackets 388 are adjustable along the curved front section 4 of the frame 1 so as to control the width of cut of the front bottom and to dispose the point of hitch in the proper position relative to the particular tractor which draws the implement. As best shown in Figure 2, changing the positon of the clamping brackets for the latches 380 and 381 does not have any appreciable effect upon the linkage 406 and 407 connecting the hitch latches to the controlling cam mechanism 405. Since the depth adjusting crank carried by the standard 189 swings with the hitch 190, it will be seen that the depth adjusting crank is always within easy reach from the tractor seat, yet is out of the way of the tractor wheels when making short turns. The entire plow is close-coupled and compact to facilitate making extremely short turns at the headlands. Also, the plow is narrow, and since there are no furrow wheels, the plow can be operated close to fences or ditches, and can be backed into close quarters permitting the operator to utilize every available bit of ground.

The rearmost of the right and left hand bottoms 110 are provided with rearwardly extending landsides 110a for the purpose of stabilizing the gangs. However, it is not necesssary that the forward plow bottoms 110 be so equipped. If it should be desirable to do so, the two bottom, two-way plow of the present invention may be reducible into a single bottom two-way plow by removing the front bottoms and standards and shifting the rear bottoms and standards, together with the landsides 110a, to the front position. Thus, the plow can be adapted to particular soil conditions present and to the smaller tractors.

Since both of the ground wheels 17 and 18 preferably are fixed to the live or through axle 14, there is ample power available to lift either or both of the gangs yet due to the fact that the ground wheels 17 and 18 are fairly close together, there is no interference on turns, notwithstanding the fact that both wheels are fixed to a single axle.

A modified form of the present invention is shown in Figures 14 and 15 in which the ground wheels are not utilized for driving the lifting mechanism but, instead, a power shaft is connected with the power take-off shaft of the tractor and is arranged to drive the lifting clutch means. Also, in this form of the invention I preferably but not necessarily employ a double clutch, that is, a clutch for the right hand gang and a separate clutch for the left hand gang, each clutch serving as a means for holding the associated gang in its elevated position while the other gang may be lowered into its operating position. In this way, I am enabled to eliminate the over-center latches 240 for the gangs.

Figure 4:
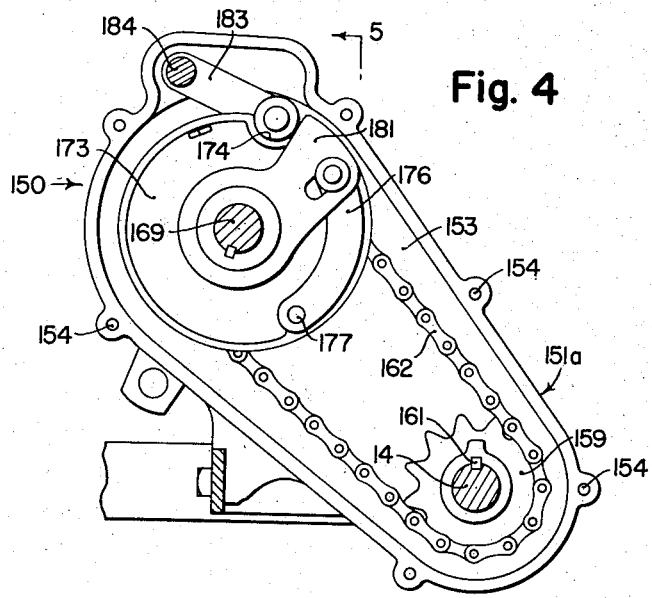
Figure 4 is an enlarged fragmentary sectional view taken approximately along the lines 4—4 of Figures 2 and 5.

Referring now to Figures 14 and 15, the reference numeral 450 indicates a power shaft driven double clutch mechanism which includes a clutch casing 451 similar to the clutch casing 151 except that it does not have any axle receiving extension such as is illustrated in Figure 4 at 151a. In Figure 14, most of the parts, except for the power shaft driven double clutch unit 450, are identical with those shown in Figure 1, and hence the corresponding reference numerals have been used in this figure for identical parts. Referring now to Figure 14, the frame 1 supports the double clutch 450 on a U-shaped bar 452 suitably bolted to the frame 1. In this form of the invention, instead of having a single lifting arm 203 (Figure 3), I employ two separate arms 454, each with its own lifting bar or stud 455, swingably mounted in the same manner as the plates 204 (Figure 3) making up the lifting arm 203. The lower ends of the arms 454 are apertured to receive bolts 457 by which a pair of lifting links 458 and 459 are pivoted, respectively, thereto. The arms 454 are pivoted on the shaft 82 adjacent the arms 231 and 232 at the inner ends of the right and left hand lifting sleeves 210.

The clutch mechanism 450 is arranged so that either or both of the lifting links 458 and 459 may be operated to raise the associated gang into lifted position. As best shown in Figure 15, the housing 451 of the double clutch mechanism 450 includes an extension 465 in which a power shaft 466 is journaled for rotation. A worm pinion 467 on the rear end of the shaft 466 meshes with a worm gear 468. The worm gear is secured to a driving sleeve 469 that is normal to the plane of the gear 468 and extends in opposite directions therefrom into the two associated clutch mechanisms that are enclosed within the housing 451. At one side the sleeve 469 serves as the driving element for a right hand clutch mechanism indicated in its entirety by the reference numeral 472, this mechanism being similar to the clutch mechanism shown in Figure 5, embodying a scalloped driving member 473 connected with the sleeve 469. The driven member of the right hand clutch 472 is indicated by the reference numeral 475, and is in the form of a plate member having a pair of notches in either of which the roller of a clutch pawl or dog (not shown) is adapted to be disposed. When so disposed in one of the notches, the roller engages an arm or plate 479 which, through pivoted straps 481, controls a roller 482 which is movable into and out of engagement with the scalloped driving member 473. A clutch trip lever 483 is connected to a short shaft 484 which extends laterally into the housing 451 from the right side of the implement and connects to the clutch dog or pawl, which is similar to the arm 183 shown in Figure 4, that controls the movement of the roller into and out of engagement with the scalloped member 473. A cable or rod 486 is connected to the upper end. The driven member 475 of the clutch 472 includes a shaft 488 to the outer end of which a lifting crank 489 having a crank pin 491 is connected. The crank pin 491 receives the lower end of the associated lifting link 459. So far as the details of the left hand clutch mechanism, indicated by the reference numeral 490, is concerned, they are substantially identical with the clutch parts just described. Hence, the same reference numerals have been used. These clutch parts do not form per se a part of the present invention, being disclosed and claimed in the co-pending application of Carl G. Strandlund, identified above.

The shaft 488 of the right hand clutch 472 and the corresponding driven shaft of the left hand clutch are supported at the center of the clutch mechanism in any suitable manner for independent rotation, preferably by some form of telescopic connection in which the inner end of each shaft is supported on or connected with the inner end of the other shaft. Such connection, as best shown in Figure 15, may take the form of a pin 492 seated in corresponding recesses in the inner ends of the driven clutch shafts 488.

The drive shaft 466, on the rear end of which the worm pinion is mounted, is supported by suitable bearings in the casing 451 and extends outwardly thereof at the forward side. At this point a universal joint 495 is mounted and is connected by a telescoping shaft 496, which includes two sections 497 and 498, the forward of which is connected by a universal joint 499 to the power take-off shaft 500 of the tractor T. From Figure 14 it will be noted that the rear universal joint 495 is disposed approximately over the pivot bolt 314 (Figure 2) which connects the rear end of the hitch 190 to the implement while the forward universal joint 499 is connected substantially directly over the point where the front end of the hitch 190 is connected with the tractor drawbar 501. When the spring cushion release unit 350 trips, the two telescoping shaft sections 497, 498 merely separate. Thus, even though the lifting clutch mechanism 450 is actuated by power derived directly from the tractor, as contrasted with the traction type of power lift clutch described above which derives power from the tractor through the forward travel of the outfit, the connections are such that the release of the implement from the tractor upon the occurrence of an abnormal load is in no wise affected.

In operation, when the operator desires to raise one of the gangs into inoperative or transport position, he pulls the control rod 486 for the clutch associated with that unit. The crank 489 of that clutch therefore is driven through a half-revolution, exerting a raising force through the associated lifting link 458 or 459, swinging the associated lifting arm 454 upwardly. The lifting bar or stud 455 on that arm engages the associated arm on the inner end of the sleeve 210, thereby raising the associated gang into transport position. Since the clutch is a half-revolution clutch, the clutch mechanism automatically locks the lifting crank 489 in its upper or raised position, thereby holding the associated gang in its raised position. Thus, the over-center toggle latches described above in connection with the form of the invention shown in Figures 1–3, are not necessary in this form of the invention. When the operator desires to lower the gang into its operating position, all that it is necessary to do is to again pull the trip rod 486, which engages the clutch mechanism for another half revolution, this time lowering the crank 489, thereby permitting the associated gang to lower into an operating position, which is determined by the crank screw adjustment described above. Thus, either clutch may be actuated independently of the other to raise or lower either unit independently of the other unit. Also, since the double clutch mechanism 450 is driven by power derived from the tractor power take-off, the clutch mechanism or mechanisms may be operated independently of whether the outfit is moving or is stationary.

Figure 19:
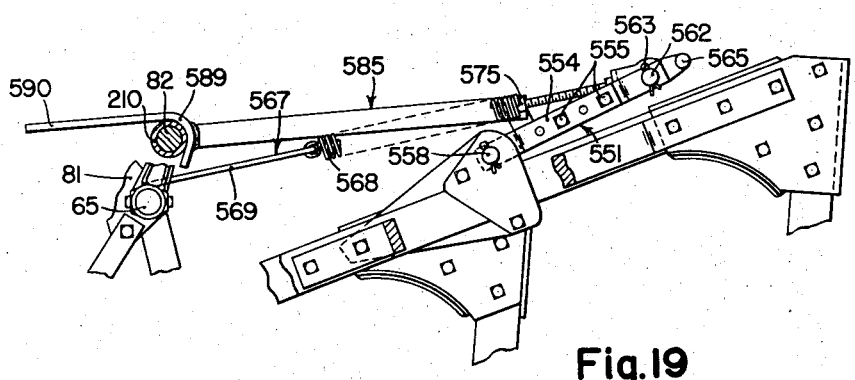
Figure 19 is a view of the gang lock-down parts when both gangs are raised.

The controlling means for the hitch latches when the power driven double clutch unit 450 is employed differs slightly from the latch controlling mechanism described above and shown in Figures 2 and 9–13. As best shown in Figure 21, when two separately operable clutches are employed for raising and lowering the right and left hand plowing units, the latches 380 and 381 controlling the swingable hitch 190 are actuated by a horizontally swingable transverse bar 511 pivoted at 514 to the upper end of a standard 512 secured at a suitable point to the plow frame, preferably above the pin 314 which connects the rear end of the hitch 190 to the implement frame. The laterally outer ends of the bar 511 are apertured to receive the rear ends of the latch controlling rods 406a and 407a, these parts being substantially the same as the rods 406 and 407 (Figure 2) except that they are slightly longer. The laterally outer ends of the transverse bar 511 are turned up and apertured to receive the forward ends, respectively, of a pair of generally longitudinally extending links 515 and 516. Springs 513 are connected between the links 515 and 516 and yield in the event both clutches are moved from lowered to raised position at the same time. As best shown in Figure 19, the rear ends of each of the links 515 and 516 are provided with slots 517, the slotted portions of the links being mounted over the crank pins 491 on the right and left hand power driven clutch cranks 489. A spring 521 is anchored, as at 522, to a stationary part of the implement frame, such as the clutch casing 451, and at its forward end is connected by a link 522 to a forwardly extending arm 523 formed on or carried by the transverse bar 511. The link 522 is connected to the arm extension 523 by a pivot 524 which is located forwardly of the pivot 314 on which the bar 511 is swingably mounted. The arm 523 and link 522 constitute an over-center connection whereby the spring 521 is adapted to hold the bar 511 in one position, hence holding one hitch latch in a disengaged position while permitting the other latch to engage, until the bar 511 is forced over past its intermediate position, the spring 521 then functioning to positively complete the movement of the bar 511 over into its other position. The rear ends of the links 406a and 407a are disposed in slots 527 formed in the bar 511 so that the latch that is disposed in a hitch-engaging position may swing back slightly when the hitch 190 is moved over into a position. By disposing the pivots 524 and 514 in the proper manner, the slots 527 may be omitted, the movement of the hitch latch, 380 or 381, in snapping over the hitch lug, 401 or 402, merely rocking the bar 511 slightly about its axis but not to an extent sufficient to cause the spring 521 to swing the bar over into its other position or to disturb the rear connection of the associated actuating link, 515 or 516, with the associated lifting clutch crank.

Figure 16:
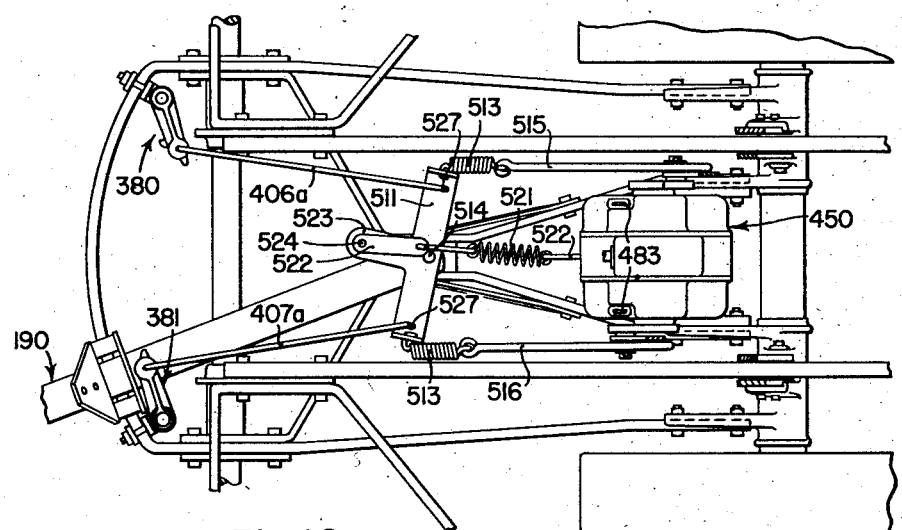
Figure 16 is a view of the hitch latch controlling mechanism employed with the double lifting clutch unit shown in Figures 14 and 15.

As best seen in Figure 14, when either clutch lifting crank swings rearwardly and upwardly to raise the associated plowing unit, the associated crank pin 491 pulls rearwardly on the associated link, swinging the bar 511 over into the other position. For example, Figures 14 and 16 show the parts in the positions they occupy when the left gang is in operating position, the right gang being held up in its inoperative position. When the left hand plowing unit is down, the hitch 190 is in a position swung to the left of the frame, being locked in this position by the latch mechanism 381. When the farmer reaches the end of the field, he pulls the trip rod for the left hand clutch, causing the crank 489 to swing upwardly and rearwardly. This upward and rearward swinging movement exerts a pull through the link 516 (Figure 16) and swings the bar 511 in a counterclockwise direction. This movement thus pulls the left latch 381 out of engagement with the hitch 190 and permits the right latch 380 to move forward into a position ready to engage the hitch when it is swung over toward the right side of the frame, which occurs as soon as the farmer turns the tractor to the right. Then when the outfit is turned around and ready to start across the field again, the operator pulls the other trip rod, lowering the right hand unit. The right hand crank 489 swings forwardly and downwardly to lower the right gang, but this movement has no effect on the latch controlling mechanism, since the right hand crank pin 491 merely moves forward in the slot 517 of the right hand link 515. The latch controlling mechanism shown in Figure 21 is therefore constructed so that when the operating unit is raised into inoperative position the latch holding the hitch member in the corresponding position is released simultaneously with the raising of the operating unit and the other latch is at the same time moved into a position ready to engage the hitch when it is swung over into that position by the subsequent turning of the tractor or other propelling force relative to the frame of the plow. This automatically engages the hitch 190 and locks it in a position ready to operate with the other plowing unit in its lowered position, the operation of the other clutch to permit the unit to lower into operating position having no effect on the latches which are already positioned for that operation.

It will be noted from the above description that the gang that is latched in its raised or non-working position is supported by the wheel frame and that the gang in operating position is floatingly connected with the wheel frame. Under most normal conditions the weight of the gang beams and associated parts is sufficient to secure the desired penetration. However, under certain difficult soil conditions, as when the soil is extremely hard, it may be desirable to increase the penetration by adding weight to the down gang, and for use under such conditions I have devised a lock down or pressure applying device which is operative to load a certain portion of the weight of the up gang onto the gang in operating position. This device will now be described.

Figure 17:
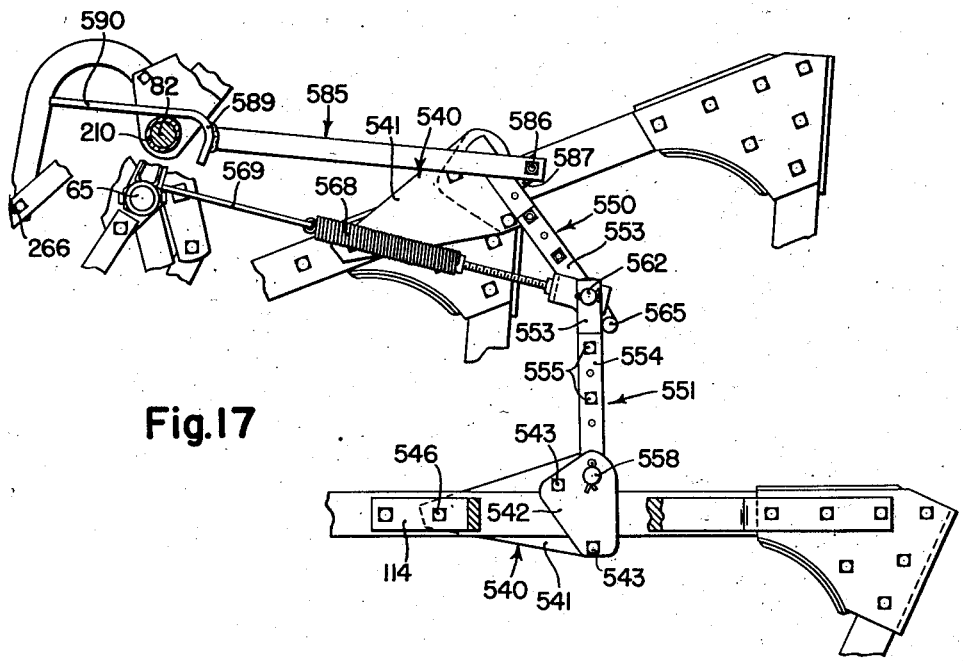
Figure 17 is a side view of a form of the present invention in which a gang lock-down unit is provided in the form of means acting between the gangs for loading at least a part of the weight of the raised gang onto the lowered gang so as to increase the penetration of the latter.
Figure 18:
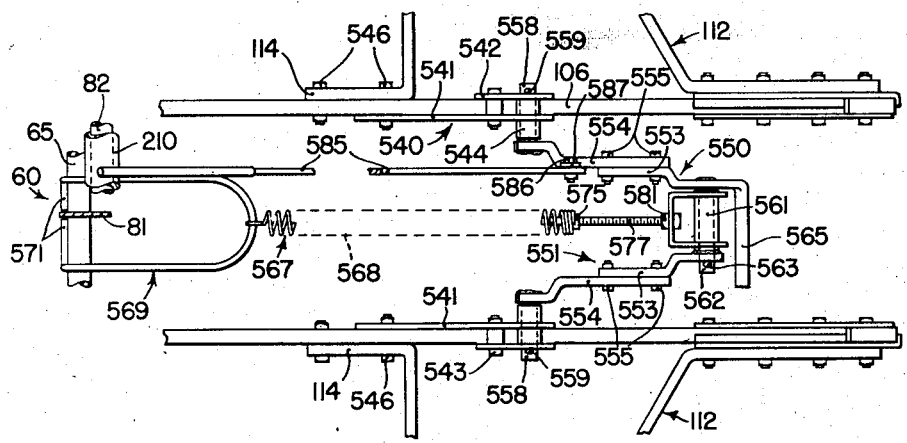
Figure 18 is a plan view of the implement parts shown in Figure 16.

Referring now more particularly to Figures 17, 18 and 19, a bracket 540 is fixed to the inner beam 106 of each plowing unit, each bracket 540 consisting of a pair of plates 541 and 542 bolted, as at 543, rigidly to the associated beam 106. The bracket 540 also includes a sleeve or pipe section 544 which is welded in apertures formed in the upper portions of the plates 541 and 542. Preferably, the bracket plates 541 and 542 are also apertured to receive one of the bolts 546 which secure the brace end 114 to the plow beam. The purpose of this arrangement is to insure that the brackets 540 will be installed in the proper position on the plow beams.

A pair of toggle links 550 and 551 are pivotally connected at their adjacent ends to each other and at their outer ends to the brackets 540. The toggle links 550 and 551 are similar, each including two strap sections 553 and 554, these sections being provided with a plurality of apertures by which a pair of bolts 555 connecting the sections together may be disposed in different positions to adjust the effective length of each toggle link, so as to provide for different depth adjustments, as will be explained below. The bolts 555 are preferably key-head plow bolts, and the openings in the strap section 554 preferably are countersunk and notched to accommodate the heads of the bolts. At their outer ends the toggle link sections 554 are provided with pins 558 which are welded to the ends of the toggle link sections 554 and are disposed in the sleeves or pipe members 544 of the associated brackets 540. The pins 558 are apertured to receive a cotter 559 which holds the toggle links pivotally connected to the associated plowing units. At their inner ends the toggle link sections 553 are provided with means pivotally interconnecting the toggle links, such means preferably consisting of a pipe member 561 secured to one of the toggle link sections 553 and a pin 562 welded to the other section, the pin fitting within the sleeve 561 and held in place by a cotter 563. One of the toggle link sections 553 is provided with an extended and laterally directed part 565 which is engageable with the companion toggle link so as to limit the extended position of the toggle mechanism, as best shown in Figure 22. The effective length of the toggle links may be varied, as required, by inserting the bolts 555 in different holes in the toggle link sections.

Spring means, indicated in its entirety by the reference numeral 567, is connected between the frame 60 and the toggle links for urging them toward straightened position. The spring means 567 includes a spring 568, the forward end of which is connected by a hook member 569 with the intermediate portion of the shaft 65 of the frame 60. To this end, the hook member 569 is relatively wide, so that the parts thereof will clear the lifting bar 207 and associated parts, and to hold the hook member 569 in position, the latter is provided with inturned parts 571, which engage the bracket 81 at the forward side of the shaft 65. The rear end of the spring 568 is connected to a nut member 575 having an internal threaded bore receiving the forward end of an adjusting bolt 577. A lock nut 581 serves to retain the bolt 577 in adjusted position. As best shown in Figure 22, the tension in the spring means 567 acts against the frame 60 and the pivot connection between the toggle links 550 and 551 for loading at least a portion of the weight of the raised gang onto the gang in lowered position. As described above, when either gang is locked in its raised position, the slot 266 (Figures 7 and 17) permits the raised gang to have a certain amount of floating movement with respect to the frame. Thus, if the gang in operating position tends to be forced out of the ground, as by passing over a hard spot, the tension in the spring means 567 reacts against the raised gang to load the weight of that gang onto the lowered gang, up to the limits of tension of the spring 568. However, this does not tend to raise the frame or the ground wheels, since normally the spring 568 is adjusted so that it yields before the raised gang will actually be moved upwardly. However, if desired, the spring 568 may be tightened to such a point that if the lowered gang tends to be forced upwardly, such movement actually lifts the raised gang and then acts against the frame by virtue of the bolt 245 moving to the other end of the slot 266, thus loading not only the weight of the up-gang but also the weight of the frame and associated parts onto the gang in operating position. Normally, however, it is preferable that the ground wheels remain firmly on the ground, and hence the spring 568 should be adjusted so that it yields before the up-gang is actually raised.

When the gang in operating position, such as the left-hand gang in Figure 17, is raised into its inoperative position, such action folds the toggle links 550 and 551 alongside one another so that when both gangs are locked in their raised position the toggle links and associated parts take the positions shown in Figure 19, in which the line of action of the spring mechanism 567 is exerted above the pivots 558, which are now in line since both gangs are raised. In this position the tension in the spring 568 would tend to swing the toggle links forwardly, or in a counterclockwise direction (Figure 19), which might bring them into a position in which neither gang could be lowered. In order to prevent this, I have provided an abutment strap 585 which at its rear end is connected by a pivot bolt 586 to an arm 587 connected to the strap member 554 of the right hand toggle link 550. The forward end of the strap member 585 is provided with a hook 589 which is extended, as at 590, and overlies the inner end of the sleeve 210 of the right hand unit, closely adjacent the lifting arm 231 for the right hand unit. The extension 590 is of sufficient length to remain on the sleeve 210 when the right hand unit, with its toggle link 550, is in a lowered position, corresponding to the position of the left hand unit and the left hand toggle link 551. As best shown in Figure 19, the strap member 585 reacts against the frame 60 to prevent the toggle links 550 and 551 from swinging forwardly beyond the position shown in this figure. In this way, either unit is free to move downwardly into operating position when its associated over-center latch is released.

Referring now to Figures 1 and 2, the means for connecting the shank of each plow beam to the beam proper will now be described. In Figure 2 it will be seen that all four of the plow bottom standards 107 are connected to the associated beam by substantially the same means, and hence a description of one will suffice. Considering the left-hand forward plow bottom 110, its standard 107 is connected to the longitudinal beam 106 by means of a pair of plate members 651 and 652, and three bolts 654 which secure the shank 107 to the bracket plates 651 and 652. The plate 652 is also provided with a second set of three holes that receive upper bolts 657 by which the plates are clamped to the rear end of the horizontal beam 105. The other plate member 651 is of similar configuration and is provided with an abutment flange 661 at the rear which engages the rear edge of the upper end of the shank 107, as best shown in Figure 1. An upper flange 662 on the plate member 651 is formed by a strap member welded to the upper edge which is adapted to engage the forward edge at the upper end of the plow bottom standard 107. The upper edge at the rear end of the horizontal beam 105 is adapted to engage under the flange 654.

The open space between the lower edge at the rear end of the beam 105 and the forward edge of the shank 107 is closed by a casting member 680. The member 680 is secured in position by a bolt 686 (Figure 1) which passes through openings in the plate members 651 and 652 and through the aperture in the attaching lug 481. Not only does the member 680 close the space just mentioned but, and what is more important, it serves to reenforce the two plate members 651 and 652 to prevent their buckling in the event the forces are reversed. Normally, these portions of the plate members 651 and 652 are under tension.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A two-way plow comprising a frame, a pair of right and left hand plowing units movably connected with the forward portion of said frame, each unit comprising a pair of beams and a pair of plow bottoms connected therewith, at least one of the beams of each pair extending over the rear portion of said frame, and a pair of land wheels connected with and supporting the rear portion of said frame and disposed, respectively, between the beams of said pairs.

2. A plow comprising a frame, a live axle journaled on the frame, a pair of wheels connected to the ends of said axle to drive the same, a pair of relatively movable right and left hand units movably connected with said frame, means for holding either of said units in a raised position independently of the other unit, a self-interrupting clutch mechanism connected to raise either or both of said units, and means for driving said clutch mechanism from said live axle.

3. An agricultural machine of the tractor drawn type, comprising a frame, a part thereon adapted to be moved from one position to the other, a relatively narrow laterally swingable hitch bar connected with said frame and adapted to be connected with said tractor, and means on said frame for shifting said part, including a longitudinally extending member extending to a point adjacent the rear of the tractor to be operated therefrom and movably connected with said part and means supporting said longitudinally extending member substantially directly over and movable with said pivoted hitch bar in different positions of the latter, whereby to maintain clearance between the rear of the tractor and said longitudinally extending member when turning.

4. A two-way plow of the tractor drawn type, comprising a frame, a pair of right and left hand units separately pivoted to the frame and adapted to be alternately lowered into an operating position, a hitch connected with the frame for lateral swinging so as to be disposable in a position with the front end thereof generally in the line of draft passing through the unit in lowered position, a common control for said units, and means for supporting said common control on and for movement with said hitch.

5. A towed two-way plow comprising a wheeled frame, a pair of right and left hand units connected therewith for movement into and out of working position, a hitch pivoted thereto and swingable laterally from one position to another, depending on which of said units is in working position, a pair of latches, one for each position, for optionally locking said hitch in either position, power operated raising means operable through two ranges, means whereby movement of said power operated raising means through one range raises either or both of said units, and means whereby the movement of the clutch through the other range controls said latches after the units are in raised position.

6. A two-way plow comprising a main wheel supported frame, an upright lifting frame connected therewith, a pair of right and left hand units movably connected with said main frame, said lifting frame including a transverse member, a pair of sleeves rockably mounted on said member, lifting arms fixed, respectively, to the laterally outer ends of said sleeves and operatively connected, respectively, with said units, arms fixed to the inner ends, respectively, of said sleeves, and means operatively connected with said inner arms for controlling the positions of said units.

7. A two-way plow comprising a main wheel supported frame, an upright lifting frame connected therewith, a pair of right and left hand units movably connected with said main frame, said lifting frame including a transverse member, a pair of sleeves rockably mounted on said member, lifting arms fixed, respectively, to the laterally outer ends of said sleeves and operatively connected, respectively, with said units, arms fixed to the inner ends, respectively, of said sleeves, a power actuated lifting arm swingably mounted on said member between said laterally inner arms and having a lifting bar adapted to engage either or both of said inner arms for raising either or both of said units.

8. A two-way two-bottom plow comprising a frame, a pair of right and left hand plowing units movably connected with said frame at their forward ends, each unit comprising a pair of laterally spaced beams, and a plow bottom fixed to the rear end of each beam, the inner beams being longer than the outer beams whereby the laterally outer bottom at each side of the plow is disposed ahead of and outwardly of the inner bottom, said frame being disposed underneath only the inside beams, axle means carried by said frame and including portions extending at each side of the plow into the space between the planes of the inner and outer beams, and a pair of ground wheels connected with said axle means, each wheel being disposed between the laterally spaced beams.

9. An agricultural machine comprising a frame, a pair of alternately operable tool units movably connected therewith, a laterally swingable hitch member pivoted to said frame and adapted to be disposed in either of two positions, a pair of latches operable, respectively, to hold said hitch member in either of its positions, a spring biased over-center member connected with both of said latches and operable to move one out of engagement with the hitch member and permit the other to move into engagement with the hitch member, means for controlling the positions of said tool units, and means for operating said over-center member from said tool unit controlling means.

10. A two-way plow comprising frame means, a pair of right and left hand plowing units swingably connected with said frame means for movement alternately into and out of operating position, and means acting between said units for loading at least a portion of the weight of the non-operating unit onto the unit in operating position, said last named means comprising a first link pivoted to one unit, a second link pivoted to the other unit, means pivotally interconnecting said links, and means for applying force to said links to extend the latter.

11. A two-way plow comprising a wheel supported frame, a pair of right and left hand units separately connected with said frame for swinging movement into and out of operating position, and spring biased means acting against the frame for loading at least a portion of the weight of the non-operating unit onto the unit in operating position, to increase the penetration of the operating unit.

12. A two-way plow comprising frame means, a pair of right and left hand plowing units connected therewith for movement into and out of operating position, and spring means adapted to react against the unit in non-operating position for applying pressure to the unit in operating position to increase the penetration thereof.

13. A two-way plow comprising frame means, a pair of right and left hand plowing units swingably connected therewith for movement into and out of operating position alternately, and spring-biased means acting between said units for loading at least a portion of the weight of the unit in non-operating position onto the unit in operating position to increase the penetration thereof.

14. A two-way plow comprising a pair of right and left hand units, a pair of toggle links connected, respectively, with said units and adapted to be extended when one unit is in operating position and the other unit in non-operating position, and spring means acting against said toggle links and reacting against the unit in non-operating position for increasing the penetration of the unit in operating position.

15. A two-way plow comprising a pair of right and left hand units mounted for movement into and out of operating and non-operating positions, a pair of toggle links, means pivotally connecting said links, respectively, to said plowing units, means pivotally connecting said links to each other, spring means acting against said last-mentioned pivotal connecting means whereby when one of said units is in non-operating position and the other is in operating position, said spring means acts through said toggle links and against the unit in non-operating position for increasing the penetration of the unit in operating position, and means for limiting the movement of said toggle links when both of said units are in non-operating position.

16. A two-way plow comprising frame means, a pair of right and left hand units independently connected with said frame means for movement into and out of operating position in side by side relation, a pair of pivotally interconnected toggle links pivoted, respectively, to said units so that when one unit is in operating position and the other unit is in non-operating position, one of said links extends generally downwardly and rearwardly from the non-operating unit while the other link extends generally upwardly and rearwardly from the unit in operating position, spring means connected to said frame means and with the adjacent ends of said toggle links, said spring means acting through said toggle links and reacting against the unit in non-operating position for loading a portion of the weight of the latter onto the unit in operating position to increase the penetration thereof, said toggle links being arranged to be disposed alongside one another when both of said units are in non-operating position, and a stop member connected with at least one of said toggle links and reacting against said frame to limit the forward movement of said toggle links under the influence of said spring means when said toggle links are disposed alongside one another and said right and left hand units are both in non-operating position, said stop means serving to prevent the movement of said toggle links into a position in which the subsequent lowering of one unit relative to the other would be affected.

17. An agricultural machine of the tractor drawn type, comprising a frame, a pivoted hitch bar connected with said frame and adapted to be connected with said tractor, a pair of latches, one adjacent each side of the frame, for holding the hitch bar in either position, means for adjustably fixing said latches in different positions along the path of swinging of said hitch bar, and means disposed adjacent the axis of swinging of said hitch bar and operatively connected with said latches for controlling the latter in any position of adjustment of the latches.

18. An agricultural implement of the tractor drawn type, comprising a frame, a hitch pivoted to the frame for lateral movement into and out of two separate positions, a pair of latches operable, respectively, to hold said hitch in either of its positions, tool means adapted to be shifted from one position to the other, means for controlling said latches comprising a pair of cam sections, means interconnecting said sections whereby they are adapted to move together, means engaged by the cam sections and connected with said latches whereby when the cam sections are operated they move one latch out of engaged position and substantially simultaneously therewith release the other latch for engagement with said hitch, mechanism for shifting said tool means, and means actuated by said mechanism for moving said cam sections according to the position of said tool means.

19. A two-way plow comprising a frame, a pair of right and left hand plowing units movably connected with said frame, each unit comprising a pair of beams and a pair of plow bottoms connected therewith, a live axle journaled on the frame, a pair of wheels connected to the ends of said axle to drive the same and disposed, respectively, between the beams of said pairs, whereby the wheel nearer the furrow is spaced an appreciable distance therefrom, lifting means for raising said units, and means for driving said lifting means from said axle.

20. A two-way plow comprising a frame, a pair of right and left hand plowing units movably connected with said frame, each unit comprising a pair of beams and a pair of plow bottoms connected therewith, a live axle journaled on the frame, a pair of wheels connected to the ends of said axle to drive the same, a single power lift clutch disposed between said units, means connecting said clutch with said units for raising either of them, and means for driving the clutch from said axle.

21. An agricultural machine comprising frame means, a pair of shiftable tool units movably connected with said frame means, a pair of rock shafts mounted on said frame means and operatively connected, respectively, with said tool units, an arm on each rock shaft, a bracket on said frame means, an adjusting screw anchored to said bracket, and means controlled by said adjusting screw and engageable with said arms for determining the position of said tool units.

22. An agricultural implement comprising a wheeled frame, a pair of units connected therewith for movement into and out of working position, a hitch pivoted thereto and swingable from one position to another, depending on which of said units is in working position, a pair of latches, one for each position, for optionally locking said hitch in either position, a self-interrupting power lift clutch operable through two ranges, means whereby movement of said clutch through one range moves either or both of said units, and means whereby the movement of the clutch through the other range controls said latches.

23. An agricultural implement comprising tool-carrying frame means, tool means therefor, means serving as a wheel frame having a transverse member at the forward end and rearwardly extending axle-receiving sections, a through axle carried by the latter, ground wheels mounted on the ends of said axle, means pivotally connecting said tool frame means with said forward transverse member for movement about a transverse axis to accommodate generally upwardly swinging movement of said tool frame means relative to the wheel frame, power lift means driven from said axle and carried by said wheel frame above said axle, and means connecting said power lift with said tool frame means for swinging the latter upwardly relative to said wheel frame.

24. An agricultural implement comprising a main wheel supported frame, an upright lifting frame connected therewith, a pair of movable tool units movably connected with said main frame, said lifting frame including a transverse member, a pair of sleeves rockably mounted on said member, lifting arms fixed, respectively, to the laterally outer ends of said sleeves and operatively connected, respectively, with said units, arms fixed to the inner ends, respectively, of said sleeves, and means operatively connected with said inner arms for controlling the positions of said units.

25. A two-way plow comprising a main wheel supported frame, an upright lifting frame connected therewith, a pair of right and left hand units movably connected with said main frame, said lifting frame including a transverse member, a pair of sleeves rockably mounted on said member, lifting arms fixed to said sleeves and operatively connected, respectively, with said units, a second arm fixed to each sleeve, and means operatively connected with said second arms for controlling the positions of said units.

26. A tractor propelled agricultural machine comprising a frame, tool means movable relative thereto and adapted to be raised and lowered, releasable means for holding said tool means in raised position, a laterally swingable hitch bar connected with said frame and adapted to be connected with said tractor, and means for actuating said releasable means including a longitudinally extending member extending to a point adjacent the rear of the tractor to be operated therefrom and means for supporting said longitudinally extending member substantially directly over and movable with said pivoted hitch bar in different positions of the latter, whereby to maintain clearance between the rear of the tractor and said longitudinally extending member when turning.

27. A tractor propelled agricultural machine comprising a frame, tool means movable relative thereto, means for adjusting the position of said tool means, a laterally swingable hitch bar connected with said frame and adapted to be connected with said tractor, and means for actuating said adjusting means including a longitudinally extending member extending to a point adjacent the rear of the tractor to be operated therefrom and means for supporting said longitudinally extending member substantially directly over and movable with said pivoted hitch bar in different positions of the latter, whereby to maintain clearance between the rear of the tractor and said longitudinally extending member when turning.

28. A tractor propelled agricultural machine comprising a frame, a hitch bar pivoted to said frame for lateral swinging movement and adapted to be hitched to the tractor, tool means movable relative thereto into different working positions and into a raised position, means for adjusting the working position of said tool means, means for raising said tool means, releasable means for holding said tool means in raised position, a pair of generally longitudinally extending members connected, respectively, with said adjusting means and said holding means, each of said members extending to a point adjacent the rear of the tractor to be operated therefrom, and means for supporting said members substantially directly over and movable with said pivoted hitch bar in different positions of the latter, whereby to maintain clearance between the rear of the tractor and said longitudinally extending members when turning.

29. A two-way plow comprising a frame, a pair of right- and left-hand units separately connected with said frame for individual movement into and out of plowing position, means on the frame for holding either of said units in a raised position, and spring means acting between the frame and the unit in operating position for imposing on the latter unit at least a portion of the weight of the other unit and said frame for increasing the penetration of the operating unit.

30. A towed two-way plow comprising a wheeled frame, a pair of right and left hand units connected therewith for movement into and out of working position, a hitch pivoted thereto and swingable laterally from one position to another, depending on which of said units is in working position, a pair of latches, one for each position, for optionally locking said hitch in either position, mechanism for raising either or both of said units, means for locking either or both of said units in raised position, and means connecting said mechanism with said pair of latches whereby successive operations of said mechanism alternately reverses the relative position of said latches, independent of the position of said units.

31. A two-way plow comprising a pair of right- and left-hand units, a self-interrupting clutch operable through substantially a full revolution at each cycle, connections between said clutch and units whereby both may be raised from lowered position by the operation of said clutch through the first part of each cycle, and releasable latch means for each unit, for holding the latter in its raised position after being raised into said position by the operation of said clutch through said first part of its cycle, completion of the cycle of movement of said clutch accommodating the lowering of either unit, each of said latch means serving to hold the associated unit in raised position when the other is dropped into its lowered position by the release of the latch means associated with that unit.

32. An agricultural implement comprising a pair of movable units, a self-interrupting clutch operable through substantially a full revolution at each cycle, connections between said clutch and units whereby both may be moved from one position to another by the operation of said clutch through the first part of each cycle, and releasable latch means for each unit, for holding the latter in one position after being moved into that position by the operation of said clutch through said first part of its cycle, completion of the cycle of movement of said clutch accommodating the movement of either unit to another position, each of said latch means serving to hold the associated unit in its one position when the other unit is moved into its other position by the release of the latch means associated with that unit.

33. A towed two-way plow comprising a wheeled frame, a pair of right and left hand units connected therewith for movement into and out of working position, a hitch pivoted thereto and swingable laterally from one position to another, depending on which of said units is in working position, a pair of latches, one for each position, for optionally locking said hitch in either position, mechanism for raising either or both of said units, and means connecting said mechanism with said pair of latches whereby successive operations of said mechanism alternately reverses the relative position of said latches, independent of the position of said units.

34. A two-way plow comprising a frame, a pair of right and left hand plowing units movably connected with said frame, each unit comprising a pair of beams and a pair of plow bottoms connected therewith, a live axle journaled on the frame, a pair of wheels connected to the ends of said axle to drive the same, a clutch casing carried by said frame between said units and embracing an intermediate portion of said live axle, power lift clutch mechanism disposed within said casing, means for driving said clutch mechanism from said intermediate portion of the axle, and means connecting said clutch with said units for raising either of them.

35. A tractor propelled agricultural machine comprising a frame, tool means movable relative thereto and adapted to be raised and lowered, power lift means for raising and lowering said tool means, a laterally swingable hitch bar connected with said frame and adapted to be connected with said tractor, and means for actuating said power lift means including longitudinally extending means extending to a point adjacent the rear of the tractor to be operated therefrom and means for supporting said longitudinally extending means substantially directly over and movable with said pivoted hitch bar in different positions of the latter.

36. A two-way plow of the tractor drawn type, comprising a frame, a pair of right and left hand units separately pivoted to the frame and adapted to be alternately lowered into an operating position, a hitch connected with the frame for lateral swinging so as to be disposable in a position with the front end thereof generally in the line of draft passing through the unit in lowered position, a control for said units, and means for supporting said control on and for movement with said hitch.

37. An agricultural implement of the tractor drawn type, comprising a frame, a hitch pivoted to the frame for lateral movement into and out of two separate positions, a pair of latches operable, respectively, to hold said hitch in either of its positions, a pair of separately movable soil working tool means connected with said frame and each adapted to be shifted relative to said frame from one position to another, mechanism operable through two ranges for shifting each of said soil working tool means from one position to the other, and means connected with said mechanism and operated by movement thereof through the last part of its range of movement when moving either of said soil working tool means for operating both latches.

38. A tractor propelled two-way plow comprising a wheel-supported frame, a pair of right and left hand plowing units movably connected with said frame, a pair of power operated units connected, respectively, with said plowing units for raising and lowering the latter, a hitch member pivotally connected with said frame for lateral swinging so as to dispose the forward end of said hitch member in line with the plowing unit in lowered position, a pair of latches operable successively for holding the hitch member in one or the other of its laterally disposed positions, latch controlling means connected with both of said latches and operable simultaneously to move one into a hitch-latching position and the other into a hitch-releasing position, and mechanism connected between both of said power operated units and said latch controlling means and operative whenever either power unit is moved into a position raising the associated plowing unit to operate one of said latches and release said hitch for movement into its other position and release the other latch to bring it into a hitch-engaging position.

39. A tractor propelled two-way plow comprising a wheel-supported frame, a pair of right and left hand plowing units movably connected with said frame, a pair of power operated units mounted on said frame and connected, respectively, with said plowing units for raising and lowering the latter, a hitch member pivotally connected with said frame for lateral swinging so as to dispose the forward end of said hitch member in line with the plowing unit in lowered position, a pair of latches for holding the hitch member in either of its laterally disposed positions, a member movably mounted on said frame and adapted to be advanced in step by step progression, means actuated by said power operated units for advancing said member, and mechanism actuted by said member by movement thereof from one position to another for opening one latch, to release said hitch, and moving the other latch into a hitch engaging position.

OREY W. OERMAN.